US012783268B2

(12) United States Patent
Li

(10) Patent No.: US 12,783,268 B2
(45) Date of Patent: Nov. 3, 2026

(54) GENERATING A CUSTOM-MADE TEMPLATE BASED ON A NATURAL LANGUAGE DESCRIPTION OF A USER'S NEEDS

(71) Applicant: Notion Labs, Inc., San Francisco, CA (US)

(72) Inventor: Lu Li, San Francisco, CA (US)

(73) Assignee: Notion Labs, Inc., San Francisco, CA (US)

( * ) Notice: Subject to any disclaimer, the term of this patent is extended or adjusted under 35 U.S.C. 154(b) by 166 days.

(21) Appl. No.: 18/610,768

(22) Filed: Mar. 20, 2024

(65) Prior Publication Data

US 2025/0355687 A1 Nov. 20, 2025

(51) Int. Cl.
*G06F 9/451* (2018.01)

(52) U.S. Cl.
CPC .................................... *G06F 9/453* (2018.02)

(58) Field of Classification Search
CPC ........................................................ G06F 9/453
See application file for complete search history.

(56) References Cited

U.S. PATENT DOCUMENTS

2022/0237255 A1* 7/2022 Koren ................. G06F 16/9535

OTHER PUBLICATIONS

ISA, International Search Report and Written Opinion for International Application No. PCT/US2025/013096, mailed on Apr. 4, 2025, 27 pages.

* cited by examiner

*Primary Examiner* — Seth A Silverman
(74) *Attorney, Agent, or Firm* — Dorsey & Whitney LLP; Lena Petrovic; Anni Siitonen

(57) ABSTRACT

The system provides multiple templates associated with a software system and multiple primitives associated with the software system to an artificial intelligence, where a template among the multiple templates includes a subset of the multiple primitives. The system provides an instruction to the artificial intelligence to generate an output template, where the instruction includes an attribute associated with a user of the software system. The system obtains from the artificial intelligence the output template including at least two primitives among the multiple primitives, where the at least two primitives are selected based on the attribute associated with the user of the software system.

20 Claims, 20 Drawing Sheets

GENERATING A CUSTOM-MADE TEMPLATE BASED ON A NATURAL LANGUAGE DESCRIPTION OF A USER'S NEEDS

BACKGROUND

Complex software systems can have a steep learning curve, thus making learning and functionality utilization challenging for users. Users may need to spend a large amount of time learning relevant features to derive value from the software system. As a consequence, users may avoid using the complex software system.

BRIEF DESCRIPTION OF THE DRAWINGS

Reference will now be made, by way of example, to the accompanying drawings, which show example embodiments of the present application and in which.

Figure 1:
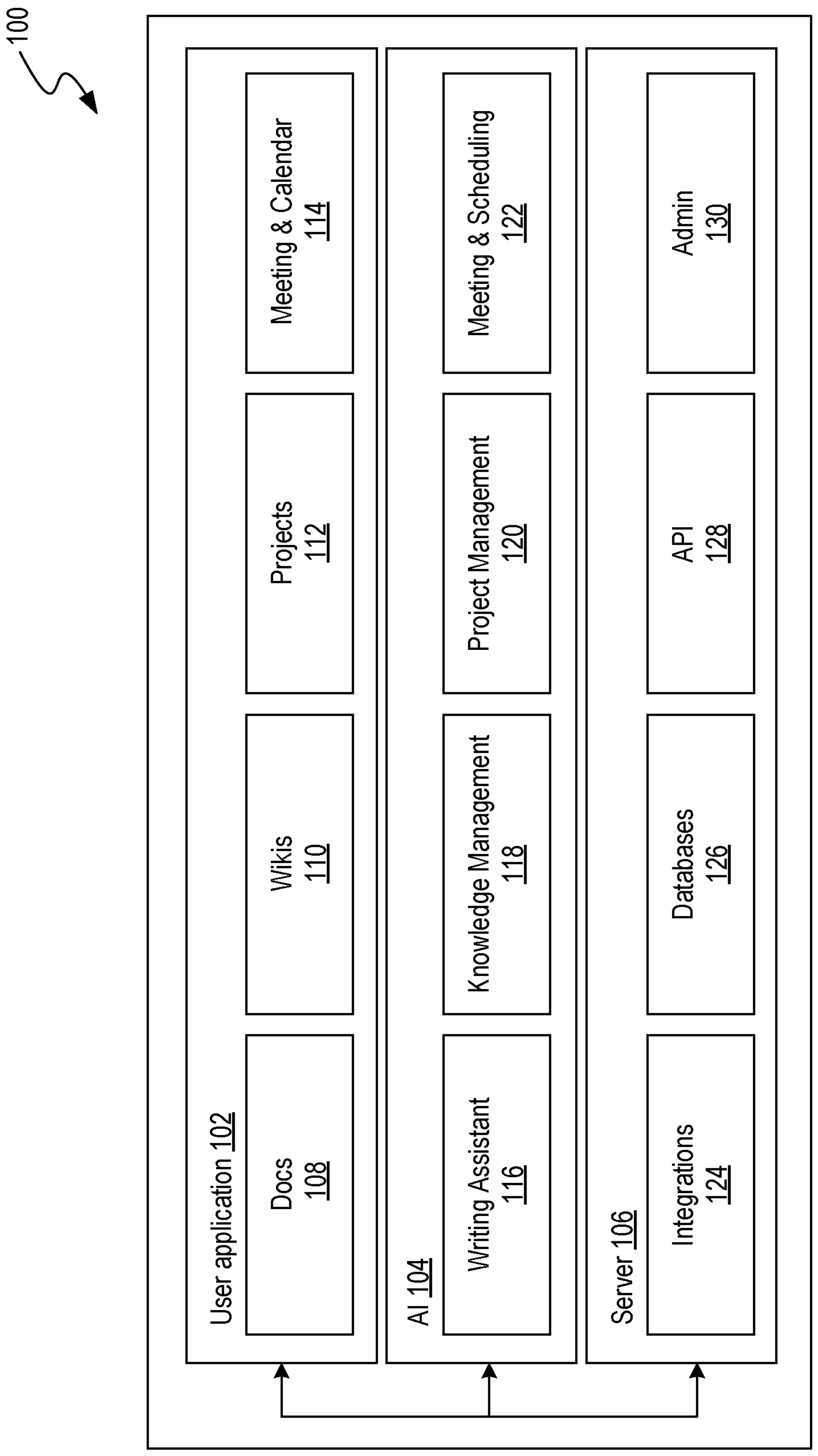
FIG. 1 is a block diagram of an example platform.

The technologies described herein will become more apparent to those skilled in the art by studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Disclosed here is a system and method to enable a user to efficiently discover and utilize a complex software system by providing prepackaged templates for the most common use case relevant to the user. The system provides a hierarchical template associated with a frequent use case of a software system, such as project management, databases, docs, wikis, and meetings. The hierarchical template includes a root template, where the root template includes multiple leaf templates. A leaf template among the multiple leaf templates is a collection of multiple primitives including at least three of one or more properties, one or more views, one or more tutorials, and one or more blocks.

A property among the one or more properties includes a name and a value. A view among the one or more views includes a view of a database according to a criterion, such as tasks associated with a particular sprint, tasks that are in progress, tasks that are due by a particular due date, tasks assigned to a particular person, etc. A tutorial among the one or more tutorials includes an explanation of a use associated with the software system. A block among the one or more blocks is configured to include content.

The system enables a user to customize an instance of the hierarchical template at multiple levels of the hierarchical template by providing a user interface input configured to add primitive A among the multiple primitives to the leaf template, remove a primitive B in the collection of multiple primitives from the leaf template, add template A to the hierarchical template, and remove a template B from the hierarchical template.

Further, disclosed is a system to generate a custom-made template based on a natural language description of a user's needs. The processor can provide multiple templates associated with a software system and multiple primitives associated with the software system to an AI. The providing can be done as part of the prompt or as part of AI training. A template among the multiple templates includes a subset of the multiple primitives, where the multiple primitives include one or more properties, one or more views, one or more tutorials, and one or more blocks.

A property among the one or more properties includes a name and a value. A view among the one or more views includes a view of a database according to a criterion. A tutorial among the one or more tutorials includes an explanation of a use associated with the software system. A block among the one or more blocks is configured to include content, such as a paragraph of text.

The system provides an instruction to the artificial intelligence to generate an output template, where the instruction includes an attribute associated with a user of the software system. The instruction can be expressed in natural language. The system obtains from the artificial intelligence the output template including at least two primitives among the multiple primitives, where the at least two primitives are selected based on the attribute associated with the user of the software system.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.

Block Data Model

The disclosed technology includes a block data model ("block model"). The blocks are dynamic units of information that can be transformed into other block types and move across workspaces. The block model allows users to customize how their information is moved, organized, and shared. Hence, blocks contain information but are not siloed.

Blocks are singular pieces that represent all units of information inside an editor. In one example, text, images, lists, a row in a database, etc., are all blocks in a workspace. The attributes of a block determine how that information is rendered and organized. Every block can have attributes including an identifier (ID), properties, and type. Each block is uniquely identifiable by its ID. The properties can include a data structure containing custom attributes about a specific block. An example of a property is "title," which stores text content of block types such as paragraphs, lists, and the title of a page. More elaborate block types require additional or different properties, such as a page block in a database with user-defined properties. Every block can have a type, which defines how a block is displayed and how the block's properties are interpreted.

A block has attributes that define its relationship with other blocks. For example, the attribute "content" is an array (or ordered set) of block IDs representing the content inside a block, such as nested bullet items in a bulleted list or the text inside a toggle. The attribute "parent" is the block ID of a block's parent, which can be used for permissions. Blocks can be combined with other blocks to track progress and hold all project information in one place.

A block type is what specifies how the block is rendered in a user interface (UI), and the block's properties and content are interpreted differently depending on that type. Changing the type of a block does not change the block's properties or content—it only changes the type attribute. The information is thus rendered differently or even ignored if the property is not used by that block type. Decoupling property storage from block type allows for efficient transformation and changes to rendering logic and is useful for collaboration.

Blocks can be nested inside of other blocks (e.g., infinitely nested subpages inside of pages). The content attribute of a block stores the array of block IDs (or pointers) referencing those nested blocks. Each block defines the position and order in which its content blocks are rendered. This hierarchical relationship between blocks and their render children is referred to herein as a "render tree." In one example, page blocks display their content in a new page instead of rendering it indented in the current page. To see this content, a user would need to click into the new page.

In the block model, indentation is structural (e.g., reflects the structure of the render tree). In other words, when a user indents something, the user is manipulating relationships between blocks and their content, not just adding a style. For example, pressing Indent in a content block can add that block to the content of the nearest sibling block in the content tree.

Blocks can inherit permissions of blocks in which they are located (which are above them in the tree). Consider a page: to read its contents, a user must be able to read the blocks within that page. However, there are two reasons one cannot use the content array to build the permissions system. First, blocks are allowed to be referenced by multiple content arrays to simplify collaboration and a concurrency model. But because a block can be referenced in multiple places, it is ambiguous which block it would inherit permissions from. The second reason is mechanical. To implement permission checks for a block, one needs to look up the tree, getting that block's ancestors all the way up to the root of the tree (which is the workspace). Trying to find this ancestor path by searching through all blocks' content arrays is inefficient, especially on the client. Instead, the model uses an "upward pointer"—the parent attribute—for the permission system. The upward parent pointers and the downward content pointers mirror each other.

A block's life starts on the client. When a user takes an action in the interface-typing in the editor, dragging blocks around a page—these changes are expressed as operations that create or update a single record. The "records" refer to persisted data, such as blocks, users, workspaces, etc. Because many actions usually change more than one record, operations are batched into transactions that are committed (or rejected) by the server as a group.

Creating and updating blocks can be performed by, for example, pressing Enter on a keyboard. First, the client defines all the initial attributes of the block, generating a new unique ID, setting the appropriate block type (to_do), and filling in the block's properties (an empty title and checked: ["No"]). The client builds operations to represent the creation of a new block with those attributes. New blocks are not created in isolation: blocks are also added to their parent's content array so they are in the correct position in the content tree. As such, the client also generates an operation to do so. All these individual change operations are grouped into a transaction. Then, the client applies the operations in the transaction to its local state. New block objects are created in memory, and existing blocks are modified. In native apps, the model caches all records that are accessed locally in an LRU (least recently used) cache on top of SQLite or IndexedDB, referred to as RecordCache. When records are changed on a native app, the model also updates the local copies in RecordCache. The editor re-renders to draw the newly created block onto the display. At the same time, the transaction is saved into TransactionQueue, the part of the client responsible for sending all transactions to the model's servers so that the data is persisted and shared with collaborators. TransactionQueue stores transactions safely in IndexedDB or SQLite (depending on the platform) until they are persisted by the server or rejected.

A block can be saved on a server to be shared with others. Usually, TransactionQueue sits empty, so the transaction to create the block is sent to the server in an application programming interface (API) request. In one example, the transaction data is serialized to JSON and posted to the/saveTransactions API endpoint. Save Transactions gets the data into source-of-truth databases, which store all block data as well as other kinds of persisted records. Once the request reaches the API server, all the blocks and parents involved in the transaction are loaded. This gives a "before" picture in memory. The block model duplicates the "before" data that had just been loaded in memory. Next, the block model applies the operations in the transaction to the new copy to create the "after" data. Then, the model uses both "before" and "after" data to validate the changes for permissions and data coherency. If everything checks out, all created or changed records are committed to the database-meaning the block has now officially been created. At this point, a "success" HTTP response to the original API request is sent by the client. This confirms that the client knows the transaction was saved successfully and that it can move on to saving the next transaction in the TransactionQueue. In the background, the block model schedules additional work depending on the kind of change made for the transaction. For example, the block model can schedule version history snapshots and indexing block text for a Quick Find function. The block model also notifies MessageStore, which is a real-time updates service, about the changes that were made.

The block model provides real-time updates to, for example, almost instantaneously show new blocks to members of a teamspace. Every client can have a long-lived WebSocket connection to the MessageStore. When the client renders a block (or page or any other kind of record), the client subscribes to changes of that record from MessageStore using the WebSocket connection. When a team member opens the same page, the member is subscribed to changes of all those blocks. After changes have been made through the saveTransactions process, the API notifies MessageStore of newly recorded versions. MessageStore finds client connections subscribed to those changing records and passes on the new version through their WebSocket connection. When a team member's client receives version update notifications from MessageStore, it verifies that version of the block in its local cache. Because the versions from the notification and the local block are different, the client sends a syncRecordValues API request to the server with the list of outdated client records. The server responds with the new record data. The client uses this response data to update the local cache with the new version of the records, then re-renders the user interface to display the latest block data.

Blocks can be shared instantaneously with collaborators. In one example, a page is loaded using only local data. On the web, block data is pulled from being in memory. On native apps, loading blocks that are not in memory are loaded from the RecordCache persisted storage. However, if missing block data is needed, the data is requested from an API. The API method for loading the data for a page is referred to herein as loadPageChunk; it descends from a starting point (likely the block ID of a page block) down the content tree and returns the blocks in the content tree plus any dependent records needed to properly render those blocks. Several layers of caching for loadPageChunk are used, but in the worst case, this API might need to make multiple trips to the database as it recursively crawls down the tree to find blocks and their record dependencies. All data loaded by loadPageChunk is put into memory (and saved in the RecordCache if using the app). Once the data is in memory, the page is laid out and rendered using React.

Software Platform

FIG. 1 is a block diagram of an example platform 100. The platform 100 provides users with an all-in-one workspace for data and project management. The platform 100 can include a user application 102, an AI tool 104, and a server 106. The user application 102, the AI tool 104, and the server 106 are in communication with each other via a network.

In some implementations, the user application 102 is a cross-platform software application configured to work on several computing platforms and web browsers. The user application 102 can include a variety of templates. A template refers to a prebuilt page that a user can add to a workspace within the user application 102. The templates can be directed to a variety of functions. Exemplary templates include a docs template 108, a wikis template 110, a projects template 112, and a meeting and calendar template 114. In some implementations, a user can generate, save, and share customized templates with other users.

The user application 102 templates can be based on content "blocks." For example, the templates of the user application 102 include a predefined and/or pre-organized set of blocks that can be customized by the user. Blocks are content containers within a template that can include text, images, objects, tables, maps, and/or other pages (e.g., nested pages or subpages). Blocks can be assigned certain properties. The blocks are defined by boundaries having dimensions. The boundaries can be visible or non-visible for users. For example, a block can be assigned as a text block (e.g., a block including text content), a heading block (e.g., a block including a heading), or a sub-heading block having a specific location and style to assist in organizing a page. A block can be assigned as a list block to include content in a list format. A block can be assigned as an AI prompt block (also referred to as a "prompt block") that enables a user to provide instructions (e.g., prompts) to the AI tool 104 to perform functions. A block can also be assigned to include audio, video, or image content.

A user can add, edit, and remove content from the blocks. The user can also organize the content within a page by moving the blocks around. In some implementations, the blocks are shared (e.g., by copying and pasting) between the different templates within a workspace. For example, a block embedded within multiple templates can be configured to show edits synchronously.

The docs template 108 is a document generation and organization tool that can be used to generate a variety of documents. For example, the docs template 108 can be used to generate pages that are easy to organize, navigate, and format. The wikis template 110 is a knowledge management application having features similar to the pages generated by the docs template 108 but that can additionally be used as a database. The wikis template 110 can include, for example, tags configured to categorize pages by topic and/or include an indication of whether the provided information is verified to indicate its accuracy and reliability. The projects template 112 is a project management and note-taking software tool. The projects template 112 can allow the users, either as individuals or as teams, to plan, manage, and execute projects in a single forum. The meeting and calendar template 114 is a tool for managing tasks and timelines. In addition to traditional calendar features, the meeting and calendar template 114 can include blocks for categorizing and prioritizing scheduled tasks, generating to-do and action item lists, tracking productivity, etc. The various templates of the user application 102 can be included under a single workspace and include synchronized blocks. For example, a user can update a project deadline on the projects template 112, which can be automatically synchronized to the meeting and calendar template 114. The various templates of the user application 102 can be shared within a team, allowing multiple users to modify and update the workspace concurrently.

The AI tool 104 is an integrated AI assistant that enables AI-based functions for the user application 102. In one example, the AI tool 104 is based on a neural network architecture, such as the transformer 212 described in FIG. 2. The AI tool 104 can interact with blocks embedded within the templates on a workspace of the user application 102. For example, the AI tool 104 can include a writing assistant tool 116, a knowledge management tool 118, a project management tool 120, and a meeting and scheduling tool 122. The different tools of the AI tool 104 can be interconnected and interact with different blocks and templates of the user application 102.

The writing assistant tool 116 can operate as a generative AI tool for creating content for the blocks in accordance with instructions received from a user. Creating the content can include, for example, summarizing, generating new text, or brainstorming ideas. For example, in response to a prompt received as a user input that instructs the AI to describe what the climate is like in New York, the writing assistant tool 116 can generate a block including a text that describes the climate in New York. As another example, in response to a prompt that requests ideas on how to name a pet, the writing assistant tool 116 can generate a block including a list of creative pet names. The writing assistant tool 116 can also operate to modify existing text. For example, the writing assistant can shorten, lengthen, or translate existing text, correct grammar and typographical errors, or modify the style of the text (e.g., a social media style versus a formal style).

The knowledge management tool 118 can use AI to categorize, organize, and share knowledge included in the workspace. In some implementations, the knowledge management tool 118 can operate as a question-and-answer assistant. For example, a user can provide instructions on a prompt block to ask a question. In response to receiving the question, the knowledge management tool 118 can provide an answer to the question, for example, based on information included in the wikis template 110. The project management tool 120 can provide AI support for the projects template 112. The AI support can include auto-filling information based on changes within the workspace or automatically track project development. For example, the project management tool 120 can use AI for task automation, data analysis, real-time monitoring of project development, allocation of resources, and/or risk mitigation. The meeting and scheduling tool 122 can use AI to organize meeting notes, unify meeting records, list key information from meeting minutes, and/or connect meeting notes with deliverable deadlines.

The server 106 can include various units (e.g., including compute and storage units) that enable the operations of the AI tool 104 and workspaces of the user application 102. The server 106 can include an integrations unit 124, an application programming interface (API) 128, databases 126, and an administration (admin) unit 130. The databases 126 are configured to store data associated with the blocks. The data associated with the blocks can include information about the content included in the blocks, the function associated with the blocks, and/or any other information related to the blocks. The API 128 can be configured to communicate the block data between the user application 102, the AI tool 104, and the databases 126. The API 128 can also be configured to communicate with remote server systems, such as AI systems. For example, when a user performs a transaction within a block of a template of the user application 102 (e.g., in a docs template 108), the API 128 processes the transaction and saves the changes associated with the transaction to the database 126. The integrations unit 124 is a tool connecting the platform 200 with external systems and software platforms. Such external systems and platforms can include other databases (e.g., cloud storage spaces), messaging software applications, or audio or video conference applications. The administration unit 130 is configured to manage and maintain the operations and tasks of the server 106. For example, the administration unit 130 can manage user accounts, data storage, security, performance monitoring, etc.

Transformer for Neural Network

To assist in understanding the present disclosure, some concepts relevant to neural networks and machine learning (ML) are discussed herein. Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer"), and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks, and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term "DNN" can encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and Auto-regressive Models, among others.

DNNs are often used as ML-based models for modeling complex behaviors (e.g., human language, image recognition, object classification, etc.) in order to improve the accuracy of outputs (e.g., more accurate predictions), for example, as compared with models with fewer layers. In the present disclosure, the term "ML-based model" or, more simply, "ML model" may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a "language model"), the training dataset may be a collection of text documents, referred to as a "text corpus" (or simply referred to as a "corpus"). The corpus may represent a language domain (e.g., a single language), a subject domain (e.g., scientific papers), and/or may encompass another domain or domains, be they larger or smaller than a single language or subject domain. For example, a relatively large, multilingual, and non-subject-specific corpus can be created by extracting text from online web pages and/or publicly available social media posts. Training data can be annotated with ground truth labels (e.g., each data entry in the training dataset can be paired with a label) or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder) or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data can be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters can be determined based on the measured performance of one or more of the trained ML models, and the first step of training (e.g., with the training set) may begin again on a different ML model described by the new set of determined hyperparameters. In this way, these steps can be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training an ML model. Backpropagation is used to adjust (e.g., update) the value of the parameters in the ML model, with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (e.g., "learn") the parameters to reduce the loss function. Backpropagation is performed iteratively so that the loss function is converged or minimized. Other techniques for learning the parameters of the ML model can be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters can then be fixed, and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. For example, an ML model for generating natural language that has been trained generically on publicly available text corpora may be, e.g., fine-tuned by further training using specific training samples. The specific training samples can be used to generate language in a certain style or in a certain format. For example, the ML model can be trained to generate a blog post having a particular style and structure with a given topic.

Some concepts in ML-based language models are now discussed. It may be noted that, while the term "language model" has been commonly used to refer to an ML-based language model, there could exist non-ML language models. In the present disclosure, the term "language model" can refer to an ML-based language model (e.g., a language model that is implemented using a neural network or other ML architecture) unless stated otherwise. For example, unless stated otherwise, the "language model" encompasses large language models (LLMs).

A language model can use a neural network (typically a DNN) to perform natural language processing (NLP) tasks. A language model can be trained to model how words relate to each other in a textual sequence based on probabilities. A language model may contain hundreds of thousands of learned parameters or, in the case of an LLM, can contain millions or billions of learned parameters or more. As non-limiting examples, a language model can generate text, translate text, summarize text, answer questions, write code (e.g., Python, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

A type of neural network architecture, referred to as a "transformer," can be used for language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as RNN-based language models.

Figure 2:
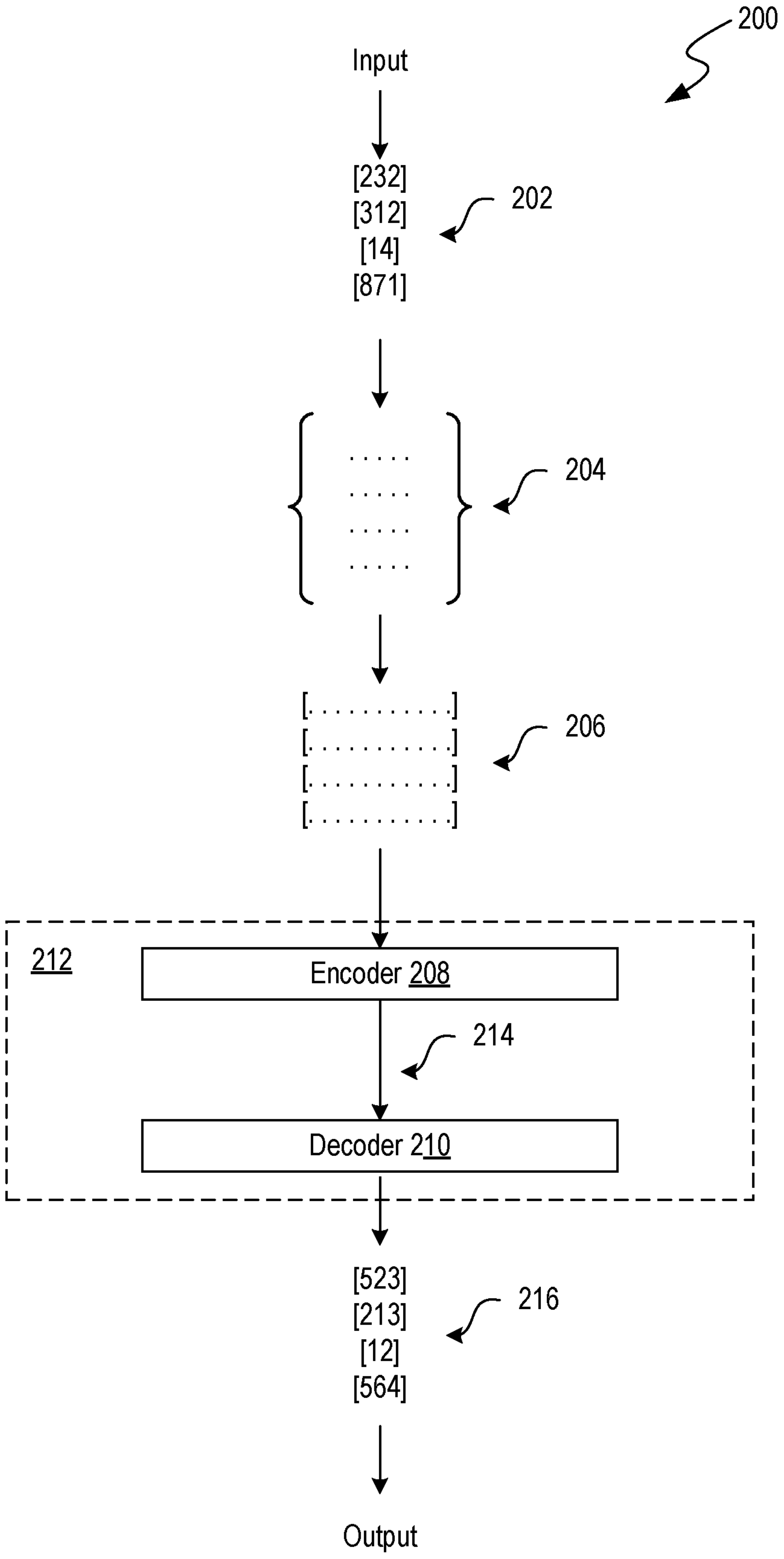
FIG. 2 is a block diagram of an example transformer.

FIG. 2 is a block diagram of an example transformer 212. A transformer is a type of neural network architecture that uses self-attention mechanisms to generate predicted output based on input data that has some sequential meaning (e.g., the order of the input data is meaningful, which is the case for most text input). Self-attention is a mechanism that relates different positions of a single sequence to compute a representation of the same sequence. Although transformer-based language models are described herein, the present disclosure may be applicable to any ML-based language model, including language models based on other neural network architectures such as recurrent neural network (RNN)-based language models.

The transformer 212 includes an encoder 208 (which can include one or more encoder layers/blocks connected in series) and a decoder 210 (which can include one or more decoder layers/blocks connected in series). Generally, the encoder 208 and the decoder 210 each include multiple neural network layers, at least one of which can be a self-attention layer. The parameters of the neural network layers can be referred to as the parameters of the language model.

The transformer 212 can be trained to perform certain functions on a natural language input. Examples of the functions include summarizing existing content, brainstorming ideas, writing a rough draft, fixing spelling and grammar, and translating content. Summarizing can include extracting key points or themes from an existing content in a high-level summary. Brainstorming ideas can include generating a list of ideas based on provided input. For example, the ML model can generate a list of names for a startup or costumes for an upcoming party. Writing a rough draft can include generating writing in a particular style that could be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some implementations, the transformer 212 is trained to perform certain functions on input formats other than natural language input. For example, the input can include objects, images, audio content, video content, or a combination thereof.

The transformer 212 can be trained on a text corpus that is labeled (e.g., annotated to indicate verbs and nouns) or unlabeled. LLMs can be trained on a large unlabeled corpus. The term "language model," as used herein, can include an ML-based language model (e.g., a language model that is implemented using a neural network or other ML architecture) unless stated otherwise. Some LLMs can be trained on a large multi-language, multi-domain corpus to enable the model to be versatile at a variety of language-based tasks, such as generative tasks (e.g., generating human-like natural language responses to natural language input).

FIG. 2 illustrates an example of how the transformer 212 can process textual input data. Input to a language model (whether transformer-based or otherwise) typically is in the form of natural language that can be parsed into tokens. The term "token" in the context of language models and NLP has a different meaning from the use of the same term in other contexts, such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some implementations, a token can correspond to a portion of a word.

For example, the word "greater" can be represented by a token for [great] and a second token for [er]. In another example, the text sequence "write a summary" can be parsed into the segments [write], [a], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list or a paragraph), an [EOT] token can be another special token that indicates the end of the textual sequence, other tokens can provide formatting information, etc.

In FIG. 2, a short sequence of tokens 202 corresponding to the input text is illustrated as input to the transformer 212. Tokenization of the text sequence into the tokens 202 can be performed by some pre-processing tokenization module such as, for example, a byte-pair encoding tokenizer (the "pre" referring to the tokenization occurring prior to the processing of the tokenized input by the LLM), which is not shown in FIG. 2 for brevity. In general, the token sequence that is inputted to the transformer 212 can be of any length up to a maximum length defined based on the dimensions of the transformer 212. Each token 202 in the token sequence is converted into an embedding vector 206 (also referred to as "embedding 206").

An embedding 206 is a learned numerical representation (such as, for example, a vector) of a token that captures some semantic meaning of the text segment represented by the token 202. The embedding 206 represents the text segment corresponding to the token 202 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding 206 corresponding to the "write" token will be closer to another embedding corresponding to the "jot down" token in the vector space as compared to the distance between the embedding 206 corresponding to the "write" token and another embedding corresponding to the "summary" token.

The vector space can be defined by the dimensions and values of the embedding vectors. Various techniques can be used to convert a token 202 to an embedding 206. For example, another trained ML model can be used to convert the token 202 into an embedding 206. In particular, another trained ML model can be used to convert the token 202 into an embedding 206 in a way that encodes additional information into the embedding 206 (e.g., a trained ML model can encode positional information about the position of the token 202 in the text sequence into the embedding 206). In some implementations, the numerical value of the token 202 can be used to look up the corresponding embedding in an embedding matrix 204, which can be learned during training of the transformer 212.

The generated embeddings 206 are input into the encoder 208. The encoder 208 serves to encode the embeddings 206 into feature vectors 214 that represent the latent features of the embeddings 206. The encoder 208 can encode positional information (i.e., information about the sequence of the input) in the feature vectors 214. The feature vectors 214 can have very high dimensionality (e.g., on the order of thousands or tens of thousands), with each element in a feature vector 214 corresponding to a respective feature. The numerical weight of each element in a feature vector 214 represents the importance of the corresponding feature. The space of all possible feature vectors 214 that can be generated by the encoder 208 can be referred to as a latent space or feature space.

Conceptually, the decoder 210 is designed to map the features represented by the feature vectors 214 into meaningful output, which can depend on the task that was assigned to the transformer 212. For example, if the transformer 212 is used for a translation task, the decoder 210 can map the feature vectors 214 into text output in a target language different from the language of the original tokens

202. Generally, in a generative language model, the decoder 210 serves to decode the feature vectors 214 into a sequence of tokens. The decoder 210 can generate output tokens 216 one by one. Each output token 216 can be fed back as input to the decoder 210 in order to generate the next output token 216. By feeding back the generated output and applying self-attention, the decoder 210 can generate a sequence of output tokens 216 that has sequential meaning (e.g., the resulting output text sequence is understandable as a sentence and obeys grammatical rules). The decoder 210 can generate output tokens 216 until a special [EOT] token (indicating the end of the text) is generated. The resulting sequence of output tokens 216 can then be converted to a text sequence in post-processing. For example, each output token 216 can be an integer number that corresponds to a vocabulary index. By looking up the text segment using the vocabulary index, the text segment corresponding to each output token 216 can be retrieved, the text segments can be concatenated together, and the final output text sequence can be obtained.

In some implementations, the input provided to the transformer 212 includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text (e.g., adding bullet points or checkboxes). As an example, the input text can include meeting notes prepared by a user, and the output can include a high-level summary of the meeting notes. In other examples, the input provided to the transformer includes a question or a request to generate text. The output can include a response to the question, text associated with the request, or a list of ideas associated with the request. For example, the input can include the question, “What is the weather like in San Francisco?” and the output can include a description of the weather in San Francisco. As another example, the input can include a request to brainstorm names for a flower shop, and the output can include a list of relevant names.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available online to the public. GPT-3 has a very large number of learned parameters (on the order of hundreds of billions), can accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as the Internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ multiple processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/cooperating computing devices as discussed above.

Inputs to an LLM can be referred to as a prompt, which is a natural language input that includes instructions to the LLM to generate a desired output. A computer system can generate a prompt that is provided as input to the LLM via an API (e.g., the API 128 in FIG. 1). As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Hierarchical Organizational Blocks in a Workspace

Figure 3:
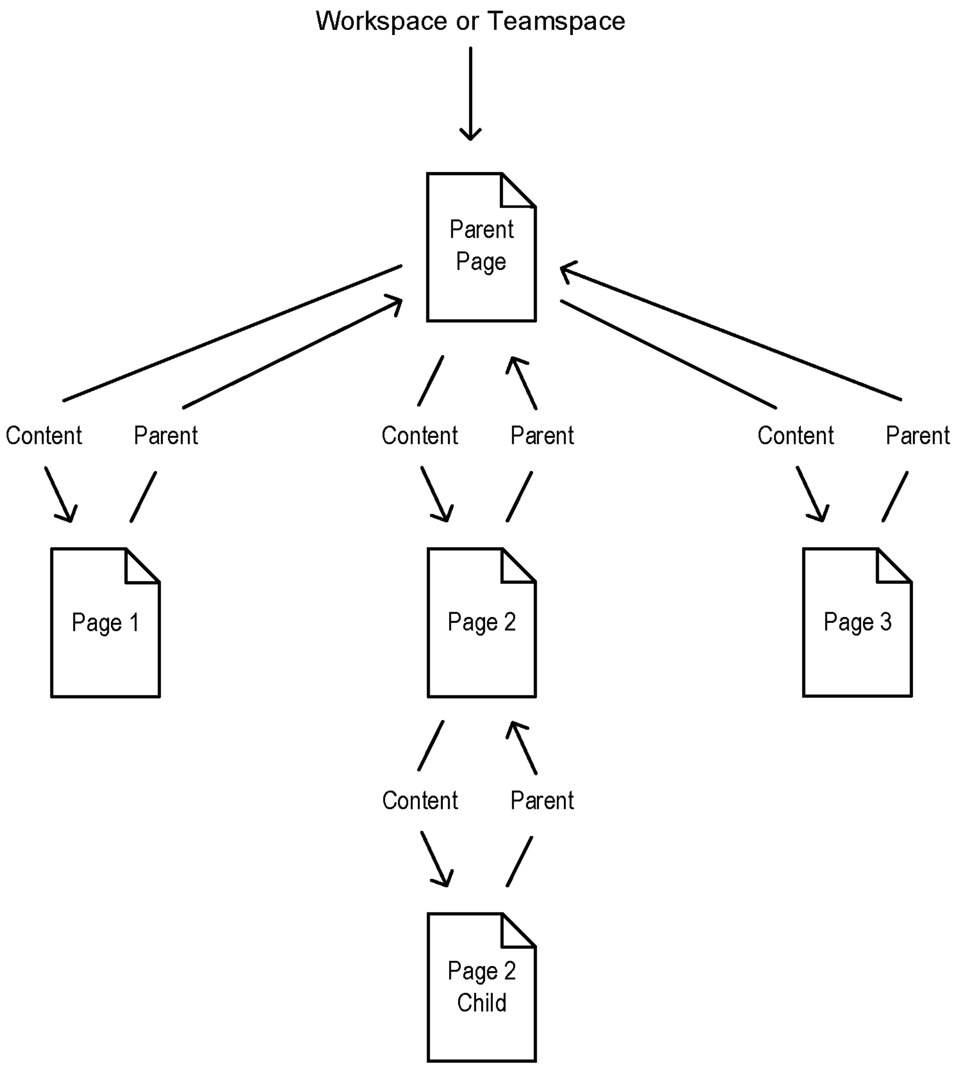
FIG. 3 is a block diagram illustrating a hierarchical organization of pages in a workspace.

FIG. 3 is a block diagram illustrating a hierarchical organization of pages in a workspace. As described with respect to the block data model of the present technology, a workspace can include multiple pages (e.g., page blocks). The pages (e.g., including parent pages and child or nested pages) can be arranged hierarchically within the workspace or one or more teamspaces, as shown in FIG. 3. The page can include a block such as tabs, lists, images, tables, etc. The page itself can be a block.

A teamspace can refer to a collaborative space associated with a team or an organization that is hierarchically below a workspace. For example, a workspace can include a teamspace accessible by all users of an organization and multiple teamspaces that are accessible by users of different teams. Accessibility generally refers to creating, editing, and/or viewing content (e.g., pages) included in the workspace or the one or more teamspaces.

In the hierarchical organization illustrated in FIG. 3, a parent page (e.g., “Parent Page”) is located hierarchically below the workspace or a teamspace. The parent page includes three children pages (e.g., “Page 1,” “Page 2,” and “Page 3”). Each of the child pages can further include subpages (e.g., “Page 2 Child,” which is a grandchild of "Parent Page" and child of "Page 2"). The "Content" arrows in FIG. 3 indicate the relationship between the parents and children, while the "Parent" arrows indicate the inheritance of access permissions. The child pages inherit access permission from the (immediate) parent page under which they are located hierarchically (e.g., which is above them in the tree). For example, "Page 2" inherited the access permission of the "Parent Page" as a default when it was created under its parent page. Similarly, "Page 2 Child" inherited the access permission of the parent page as a default when it was created under its parent page. "Parent Page," "Page 2," and "Page 2 Child" thereby have the same access permission within the workspace.

The relationships and organization of the content can be modified by changing the location of the pages. For example, when a child page is moved to be under a different parent, the child page's access permission modifies to correspond to the access permission of the new parent. Also, when the access permission of "Parent Page" is modified, the access permission of "Page 1," "Page 2," and "Page 3" can be automatically modified to correspond to the access permission of "Parent Page" based on the inheritance character of access permissions.

In contrast, however, a user can modify the access permission of the children independently of their parents. For example, the user can modify the access permission of "Page 2 Child" in FIG. 3 so that it is different from the access permission of "Page 2" and "Parent Page." The access permission of "Page 2 Child" can be modified to be broader or narrower than the access permission of its parents. As an example, "Page 2 Child" can be shared on the internet, while "Page 2" is shared only internally with the users associated with the workspace. As another example, "Page 2 Child" can be shared only with an individual user, while "Page 2" is shared with a group of users (e.g., a team of the organization associated with the workspace). In some implementations, the hierarchical inheritance of the access permissions described herein can be modified from the previous description. For example, the access permissions of all the pages (parent and children) can be defined as independently changeable.

Enabling a User to Efficiently Discover and Utilize a Complex Software System

Figure 4:
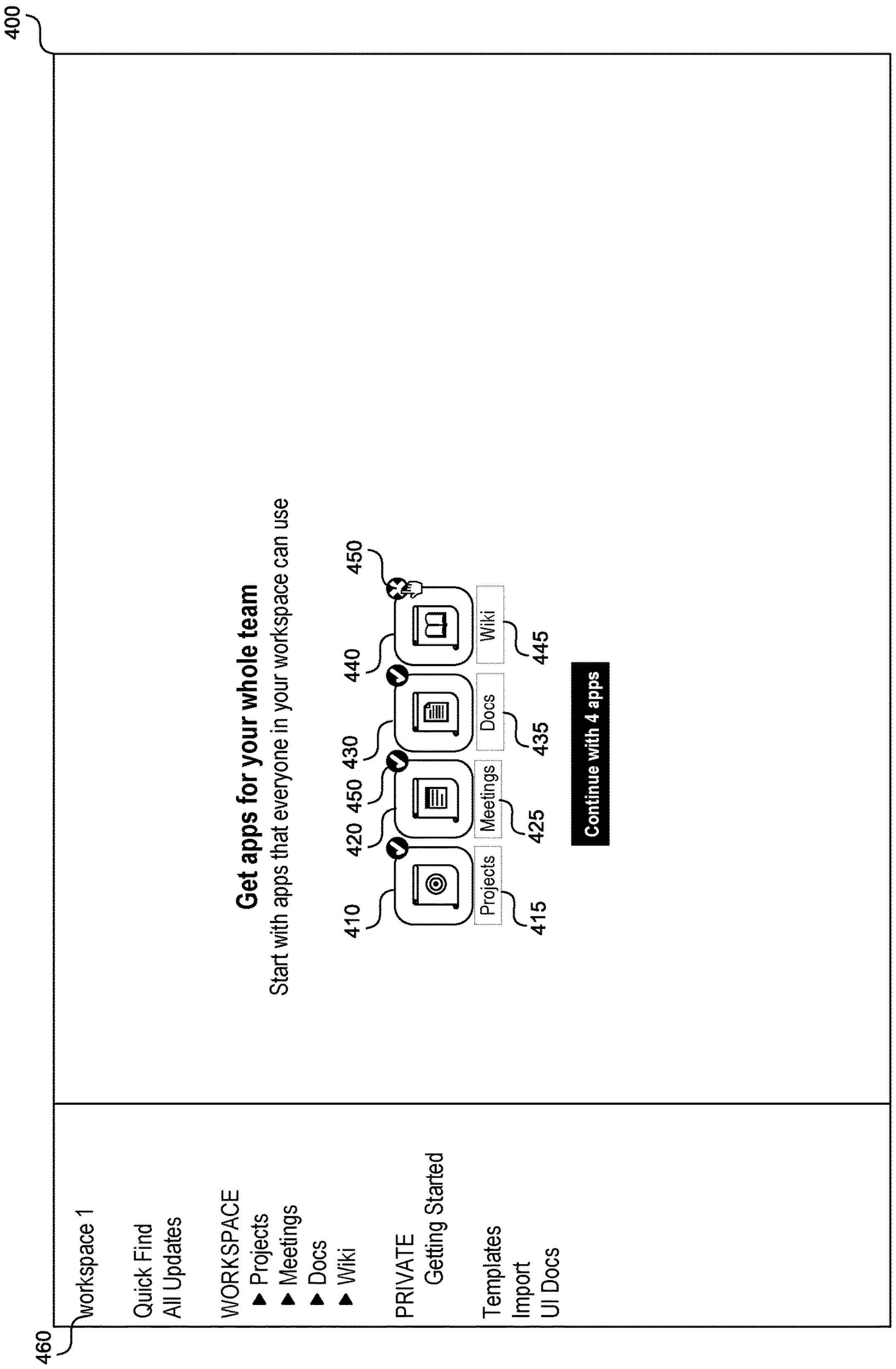
FIG. 4 shows the main use cases of a software system.

FIG. 4 shows the main use cases of a software system. The software system 400 can be complex with many features and consequently can have a high learning curve. A novice user can easily get disoriented when faced with the complexities and features of the software system 400. Consequently, the software system 400 can offer prepackaged templates 410, 420, 430, 440, which correspond to the most common use cases of the software system 400, thus saving the user the work of creating the templates and learning many features of the software system.

A template 410, 420, 430 is a collection of one or more primitives and/or one or more templates. The prepackaged templates 410, 420, 430 can be hierarchical and can include other templates and/or primitives as described in this application. The prepackaged templates 410, 420, 430, 440 can have a template type 415, 425, 435, 445 that corresponds to a frequent use case including a project management, a meeting, a document, or a wiki, respectively. By selecting user interface element 450, the user can choose whether to include a particular template 410, 420, 430, 440 in the user's workspace 460.

Figure 5:
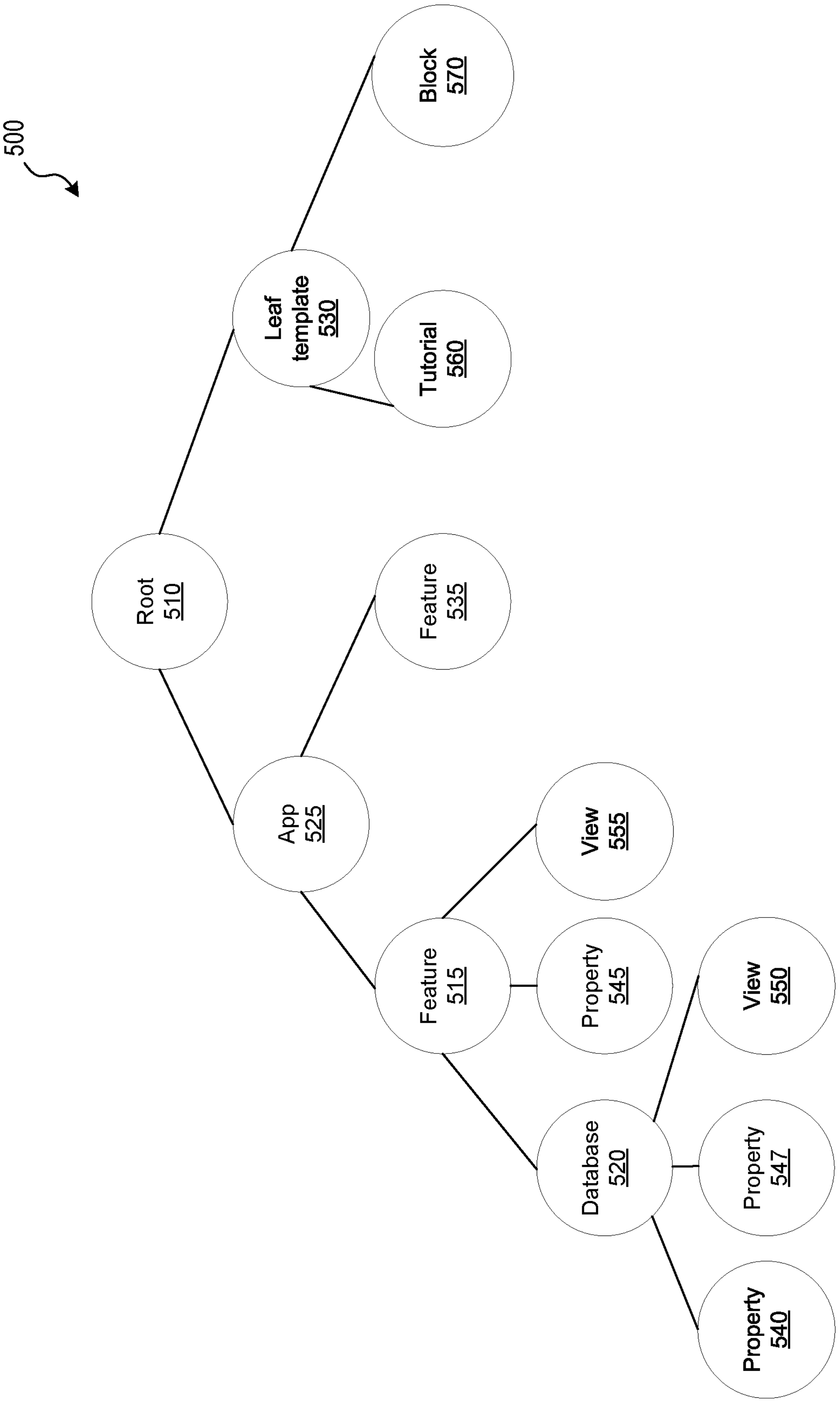
FIG. 5 shows a hierarchical template.

FIG. 5 shows a hierarchical template. The hierarchical template 500 can be one of the template types 415, 425, 435, 445 in FIG. 4 and can correspond to a frequent use case of a software system. The hierarchical template 500 can include a root template 510, which includes multiple leaf templates 520, 530. The leaf template 520, 530 can include one or more primitives such as a property 540, a view 550, a tutorial 560, or a block 570. In addition to being a leaf template, a database template can be a parent of the leaf template 530 and a grandparent to leaf template's children.

The property 540 is akin to a field in a database and can include a name and a value. A template can include a bundle of predefined properties such as "edited by," "assignee," "task," etc.

The view 550 is a selection of multiple properties based on a criterion such as tasks associated with a particular sprint, tasks that are in progress, tasks that are due by a particular due date, tasks assigned to a particular person, etc.

The tutorial 560 includes tips on how to use the software system 400 in FIG. 4, such as videos, images, or text. The software system 400 can present the tutorial 560 when the user initially accesses an instance of the template. The tutorial 560 can correspond to the type of the hierarchical template 500.

The block 570 includes content, as described in this application. When the software system 400 receives an input to move the block 570 from the parent template 520 to a receiving template 530, the software system can check whether the template type of the template 520 corresponds to the template type of the receiving template 530. If the two template types do not match, the system can refuse to make the move, while the system can move the block if the two template types match.

The hierarchical template 500 can have one or many database templates 520. When the hierarchical template 500 includes one child database template 520, the database template can be considered to be the root of the tree and be the hierarchical template 500 itself. The database 520 is a collection of one or more properties 540, 547 and views of the properties 550. The database 520 can be typed or non-typed. The typed database can include a task database, a project database, etc. If the database 520 is typed, the software system 400 can provide more advanced tools to operate on the database. A non-typed database 520 is a generic database.

The hierarchical template 500 can have one or many feature templates 515. When the hierarchical template 500 includes one child feature 515, the future template can be considered to be the root of the tree and be the hierarchical template 500 itself. The feature 515 is a collection of one or more properties 540, 545, views 550, 555, and databases 520. The feature 515 can be a sprint feature including multiple properties contained in a sprint database and multiple views of the sprint database. Views can include all tasks for the sprint or all projects for the sprint. A property associated with the task can indicate whether the task is related to the sprint. Similarly, a property associated with a project can indicate whether the project is related to the sprint, and the views can be generated based on the property.

An app 525 can be a hierarchical template 500. An app 525 is a collection of one or more templates including the feature 515, 535. The app 525 can be a to-do list of tasks. The app 525 can be a to-do list of tasks and a project database. The app 525 can be a to-do list of tasks, a project database, and a sprint database. The app 525 can contain dependencies between multiple sprint features 515. For example, initiation of sprint 515 can depend on completion of a previous sprint.

The user can modify the templates 500, 520, 515, 525 by adding or removing primitives, adding, removing, or changing primitive values, and adding or removing templates. For example, in an app template 525, the user can add a new feature or remove an existing feature. In another example, in the database template 520, the user can add or remove a property, add or remove a view, or add or remove a value of the property.

Hierarchical template 500 can be modified by including or excluding optional templates and by enabling a user to define property dependencies between templates 520, 515. For example, the hierarchical template 500 can include required templates, such as a sprint database, or optional templates, such as a to-do list. The user can modify the hierarchical template by including or excluding the optional templates, e.g. the to-do list. In addition, the user can modify the hierarchical template 500 by modifying relationships between the templates 520, 515, 525 within the hierarchical template 500. Specifically, the templates 520, 515, 525 can depend on each other. For example, multiple databases in the hierarchical template 500 can have property dependencies among each other. The property dependencies can be predefined, or the user can modify the hierarchical template 500 by establishing new property dependencies between the databases.

The user can receive a template 525 including templates 520, 515, 535 and template 530 including templates 560, 570, and can modify the template at multiple levels of the hierarchy such as the primitive 540, 547, 550, 560, 570 level, database 520 level, the feature 515, 535 level, or the app 525 level. Certain modifications may not be allowed, such as that a feature 515 has to have a particular database or that certain view or a certain property has to be included. Certain parts of the template, e.g., properties, views, tutorials, blocks databases, features, and apps, may be optional, and the user can include or exclude the optional features. In addition, the user can add parts of the template that are not included as optional in the template, such as by adding a new database to an app 525.

Figure 6:
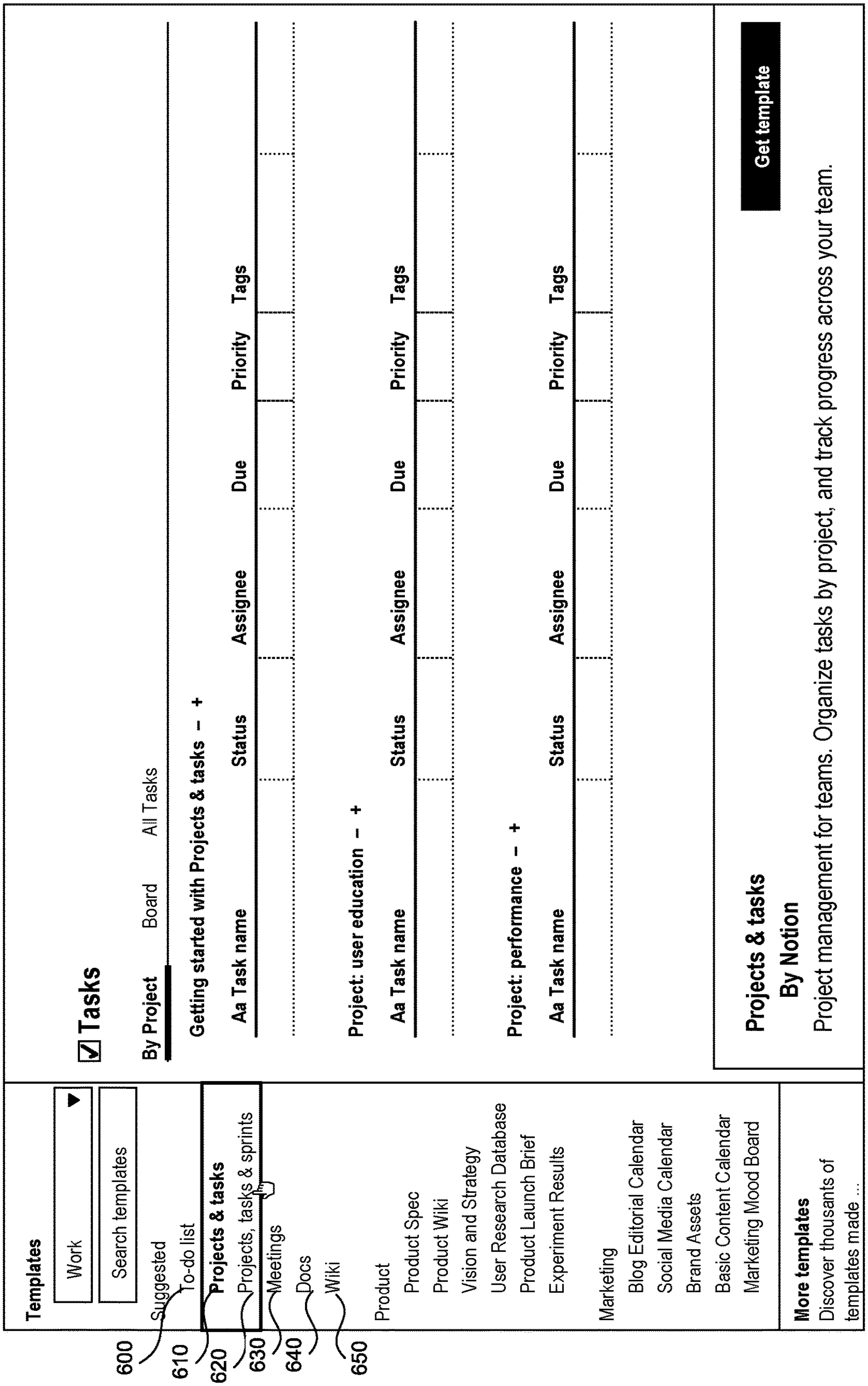
FIG. 6 shows different examples of an app.

FIG. 6 shows different examples of an app. An app 525 in FIG. 5 can be a to-do list 600, projects and tasks 610, project, tasks, and sprints 620, meetings 630, docs 640, or wiki 650. The to-do list 600 can be a presentation of tasks 610. The to-do list 600, projects and tasks 610, and project, tasks, and sprints 620 can all be project management templates. Project management use case of the software system 400 in FIG. 4 can be the most important and versatile template. Feature template 515, 535 in FIG. 5 and app template 525 used in project management can include multiple databases that can communicate with each other and whose properties can depend on each other.

In addition, app template 525 can also include other app templates such as meetings 630 and/or docs 640. For example, if the app template 525 includes the meetings 630 template, the app template can be used for meeting notes related to the project. In addition, if the app template 525 includes docs template 640, the docs template can be used for ticketing and tracking status of open tickets, such as reported bugs.

Figure 7A:
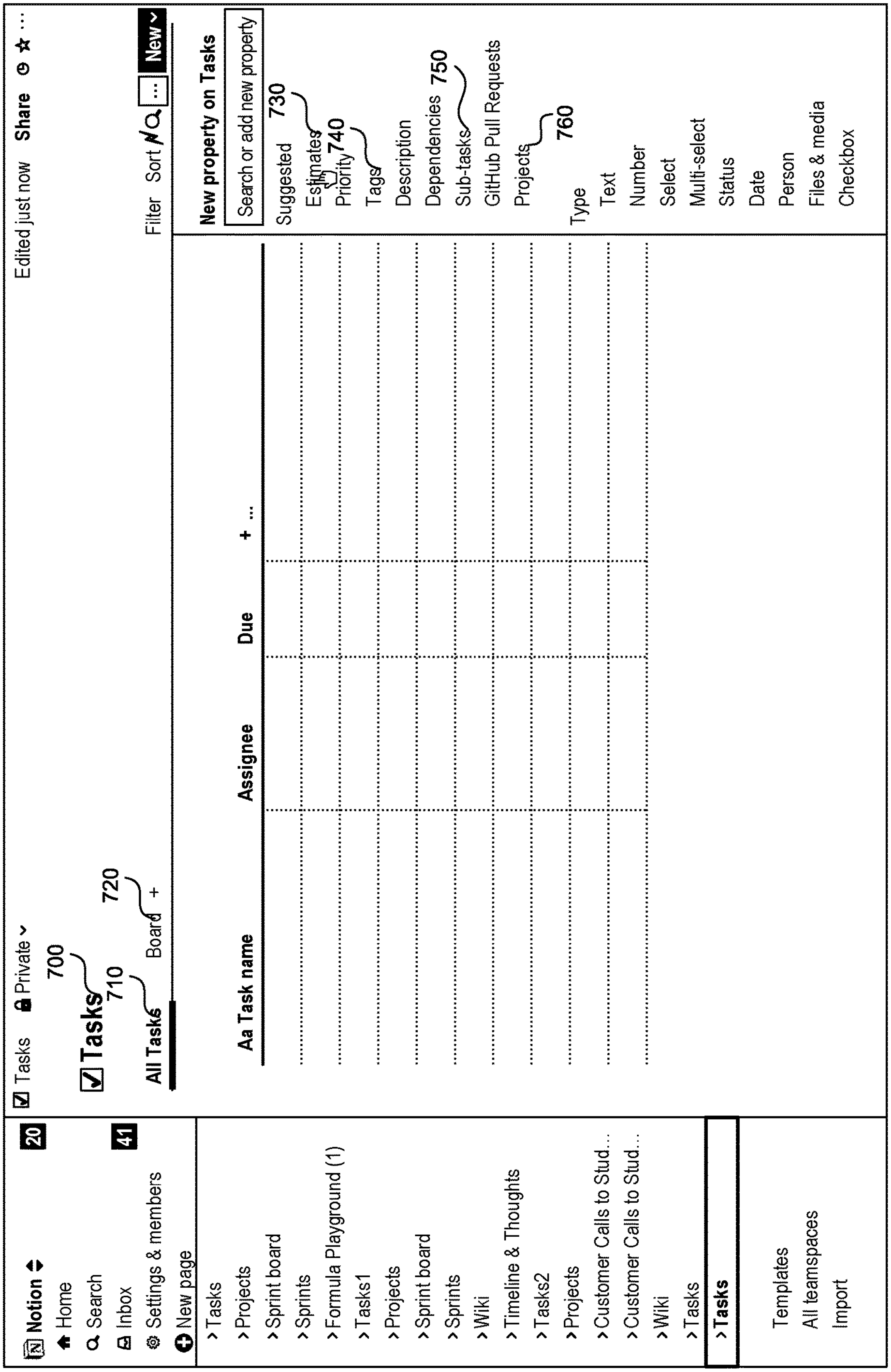
FIGS. 7A and 7B show a to-do list template with optional primitives and templates.
Figure 7B:
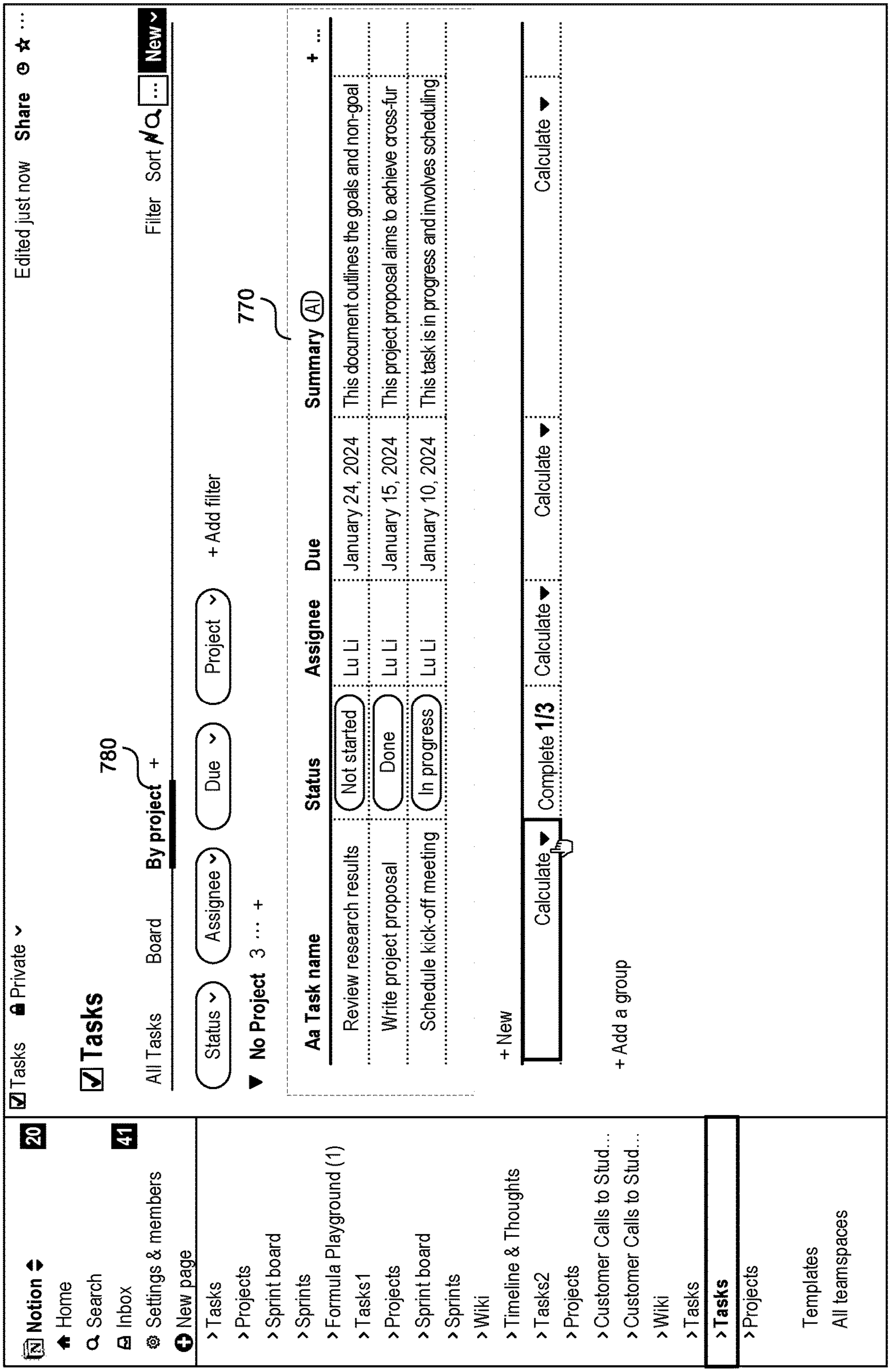

FIGS. 7A and 7B show a to-do list template with optional primitives and templates. To-do list, e.g., tasks, template 700 can include different views, including all tasks view 710 and board view 720. To-do list template 700, which is an app template, can offer a property 730, view 740, database 750, or feature 760 to include in the to-do list. By selecting a primitive such as a property 700 or view 740, the user can add the primitive to the to-do list template 700. The user can further add or remove value associated with the property 700 added to the primitive.

By selecting a template such as feature 760, e.g., a projects feature, the user can add a new database 770 to the template 700, as shown in FIG. 7B. The project view 780 enables viewing the tasks by project. The project feature can include a database template with prepackaged views.

Figure 8:
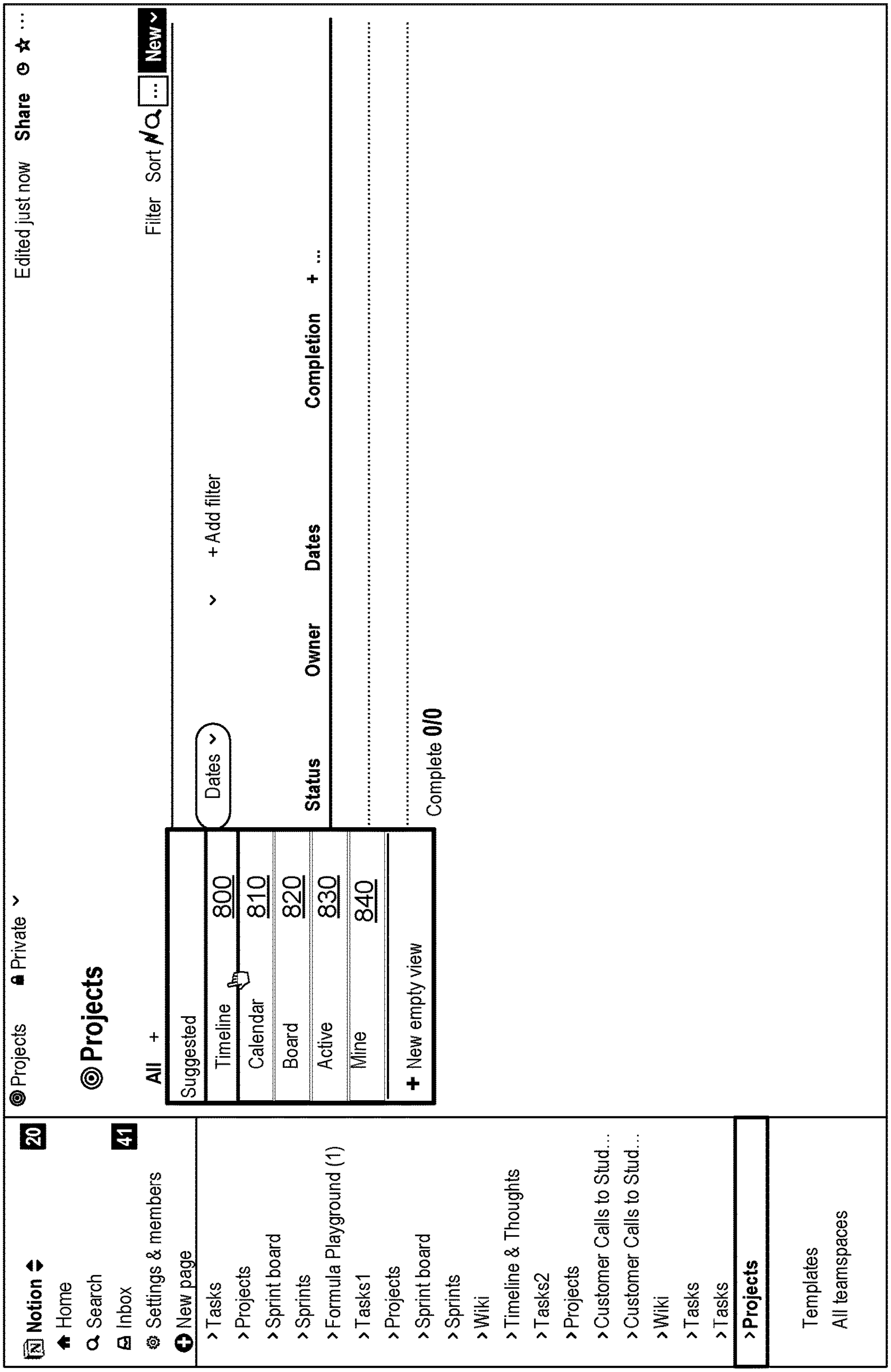
FIG. 8 shows various views that are prepackaged with the project features.

FIG. 8 shows various views that are prepackaged with the project features 760 in FIG. 7A. The prepackaged views can include timeline view 800, calendar view 810, board view 820, active view 830, and mine view 840. The timeline view 800 can show the timeline of the various tasks in the project. The calendar view can show calendar events associated with the project. The board view 820 can show visualization boards, such as a Kanban board associated with the project, and active view 830 can show the tasks that are in progress right now. Mine view 840 can show tasks that are assigned to a particular user.

Figure 9:
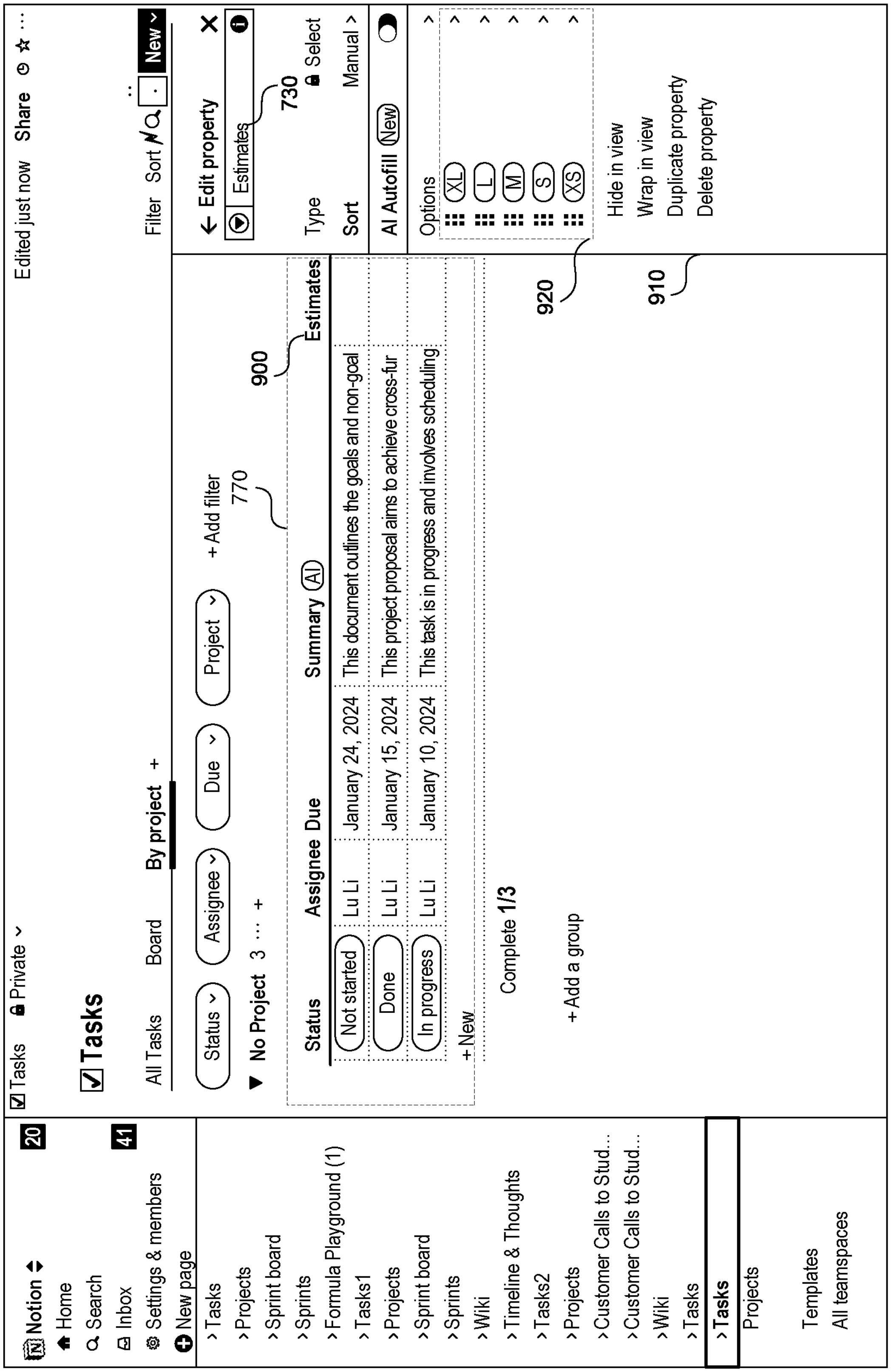
FIG. 9 shows adding and modifying a property in a feature.

FIG. 9 shows adding and modifying a property in a feature 760 in FIG. 7A. When the user selects the property 730, e.g., estimate property, the property 900 is added to the database 770. The estimate property 730 can represent a T-shirt size, and the menu 910 can list the values 920 that the estimate property can take, namely, various T-shirt sizes. The user can modify the options that the estimate property 730 can take by adding new values or removing values from the listed values 920.

Figure 10:
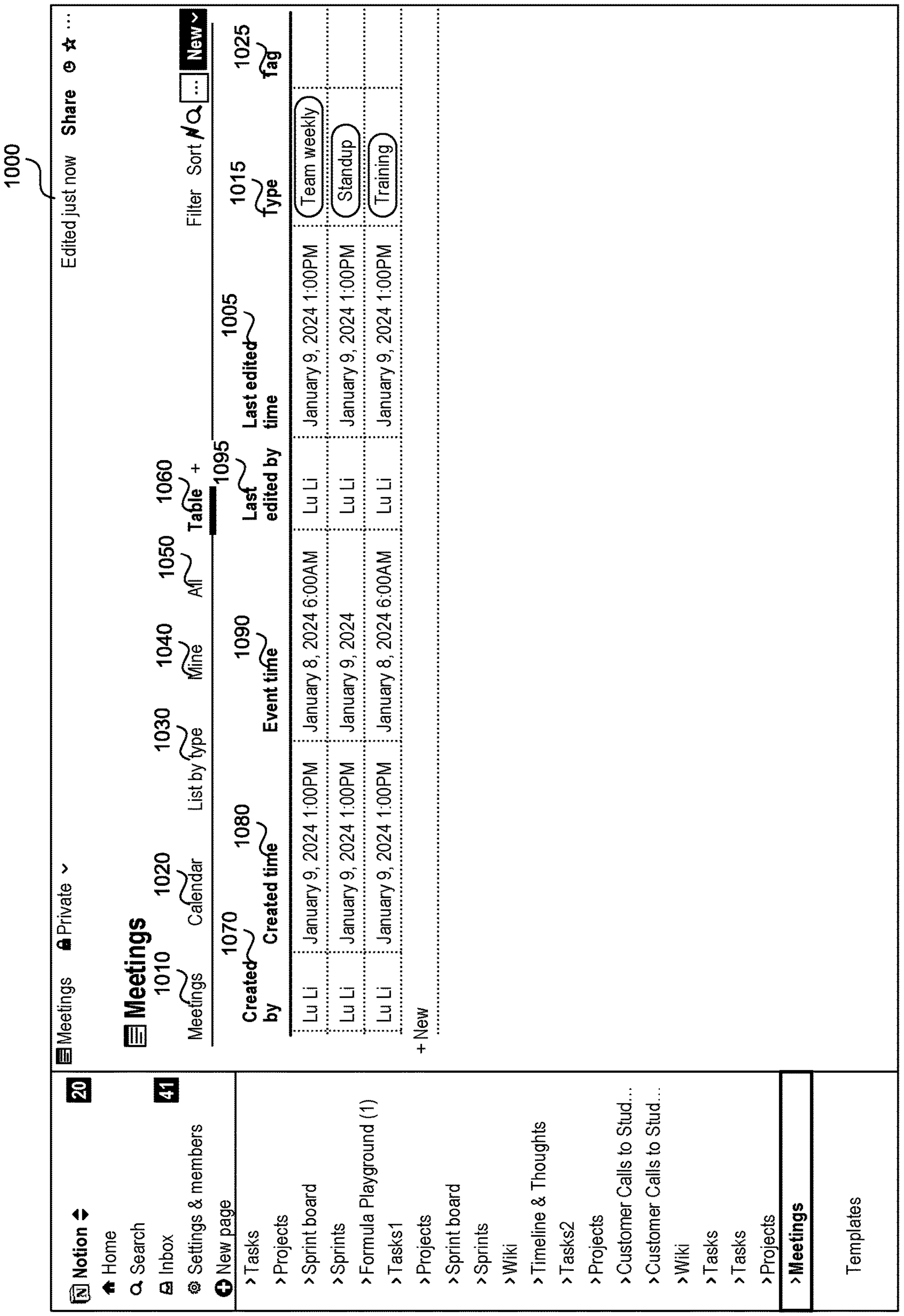
FIG. 10 shows a calendar template.

FIG. 10 shows a calendar template 1000. The calendar template 1000 can include different views such as meetings 1010, calendar 1020, list by type 1030, mine 1040, all 1050, or table 1060. In addition, each view can include various properties. For example, the meetings view 1010 can include properties such as created by 1070, created time 1080, event time 1090, last edited by 1095, last edited time 1005, type 1015, and tag 1025. The properties and views can be edited as described in this application.

Figure 11:
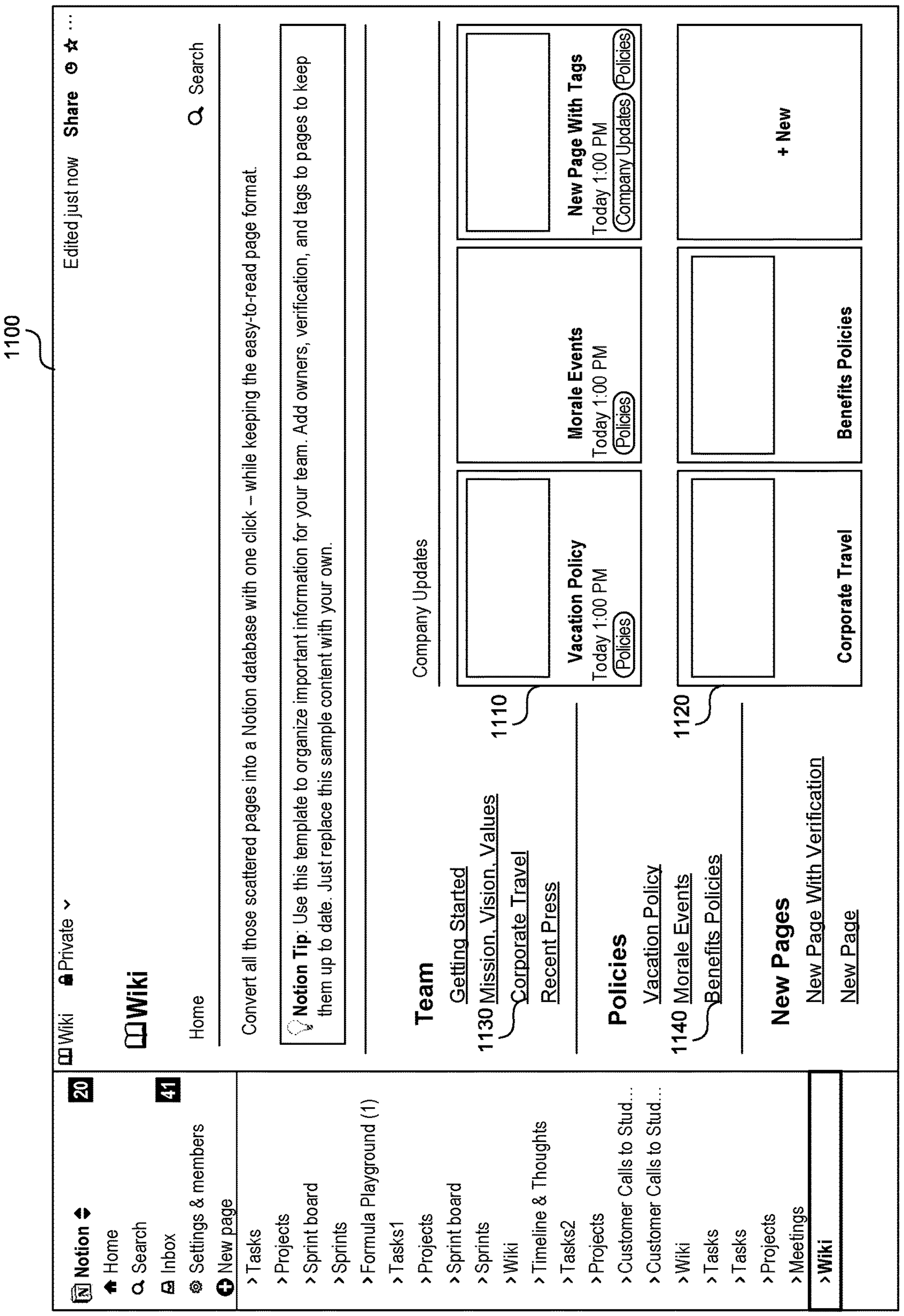
FIG. 11 shows a wiki template.

FIG. 11 shows a wiki template 1100. The wiki template 1100 can include a single database that organizes various documents, including page templates 1110, 1120, into a single web page containing links 1130, 1140. The documents can include tags such as owners, verification, and time created.

Figure 12A:
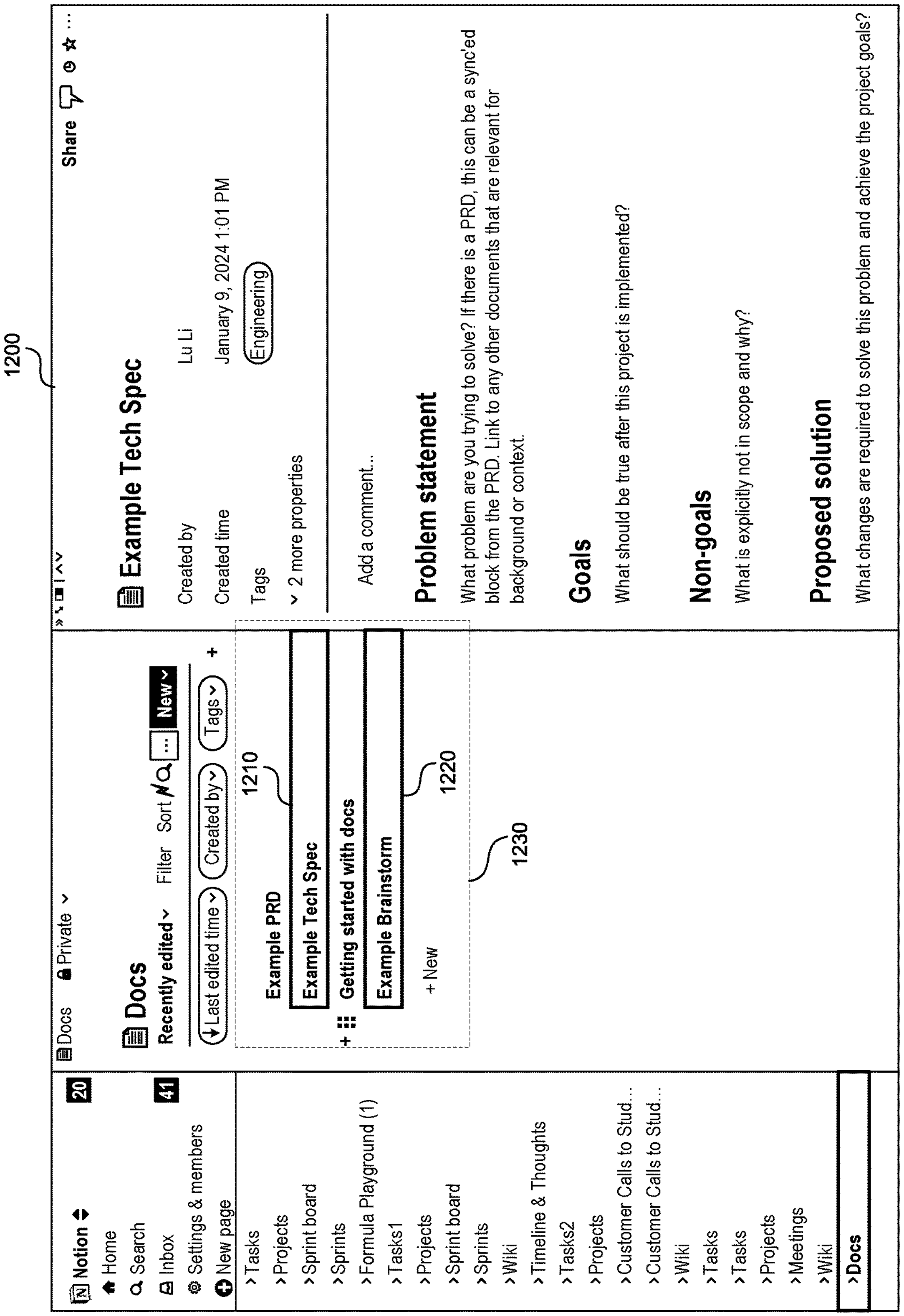
FIGS. 12A and 12B show a document template.
Figure 12B:
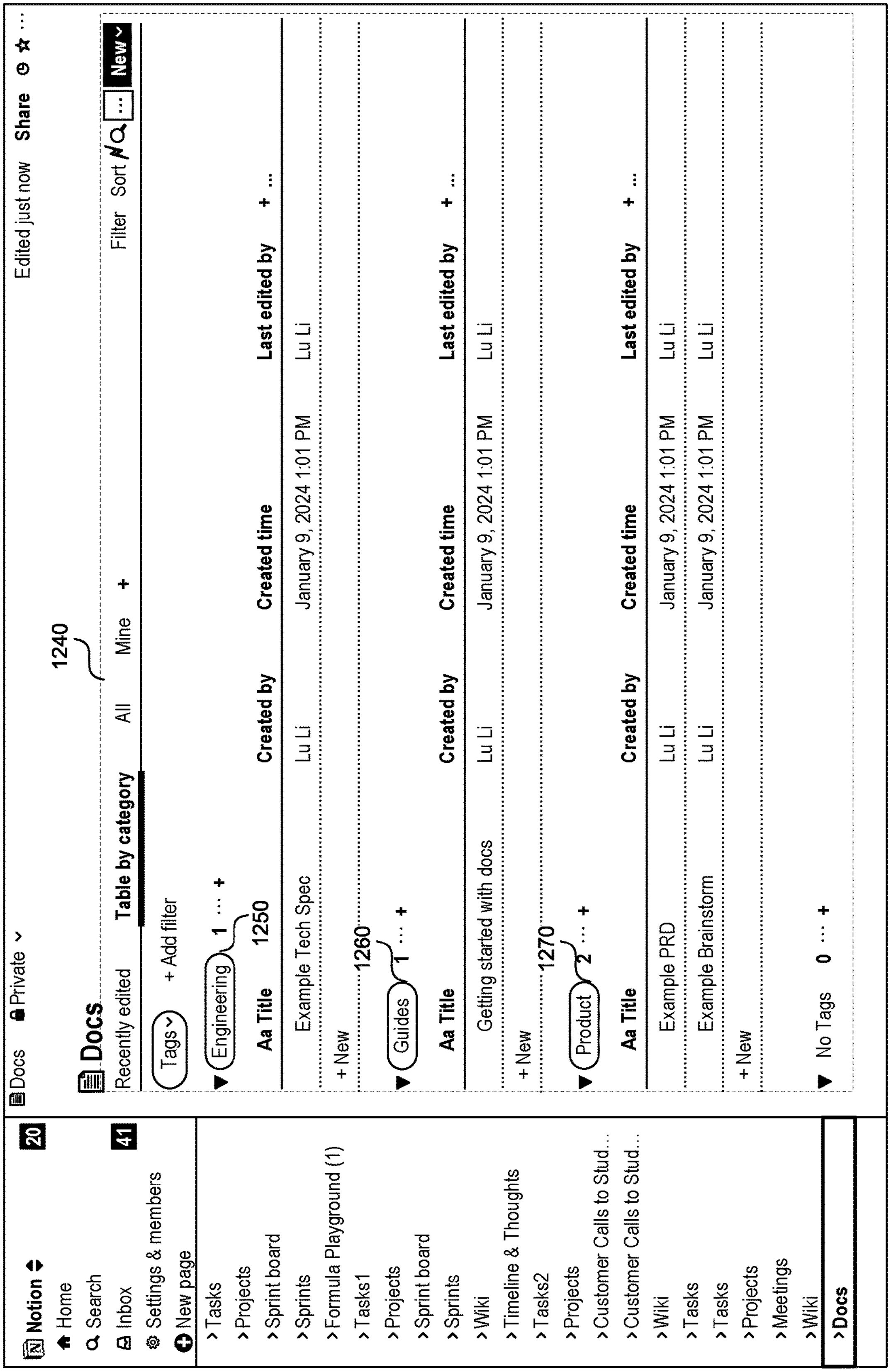

FIGS. 12A and 12B show a document template 1200. The document template 1200 can include a single database and multiple documents 1210, 1220 (only two labeled for brevity). In addition, the document templates 1200 can include multiple views, such as a list view 1230 and a table view 1240. The documents 1210, 1220 can include tags such as engineering 1250, guides 1260, or product 1270. Based on the tags, the table view can group the multiple documents 1210, 1220, as shown in FIG. 12B.

Figure 13:
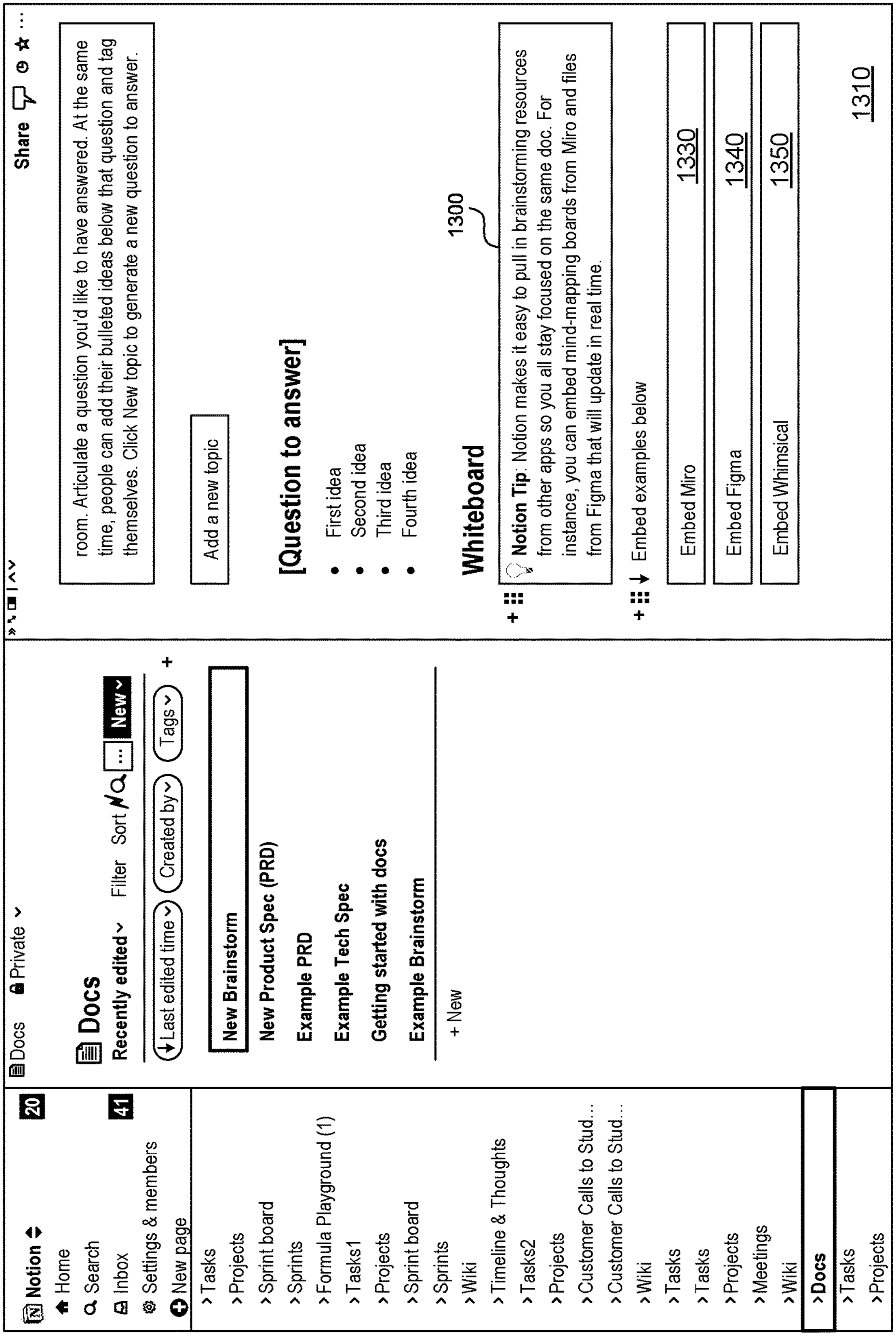
FIG. 13 shows tips that can be embedded in the template.

FIG. 13 shows tips that can be embedded in the template. The tip 1300 may not be saved as a part of the document 1310; however, it provides useful information to a user on how to utilize the software system 400 in FIG. 4. For example, the tip 1300 can explain that resources from other applications can be incorporated into one document 1310. Specifically, the resources from the other applications can be embedded in the document 1310 and can automatically update as the source document updates. Tips 1330, 1340, 1350 can individually identify other applications from which files can be embedded. The other applications can include Miro, Figma, Whimsical, etc.

Figure 14:
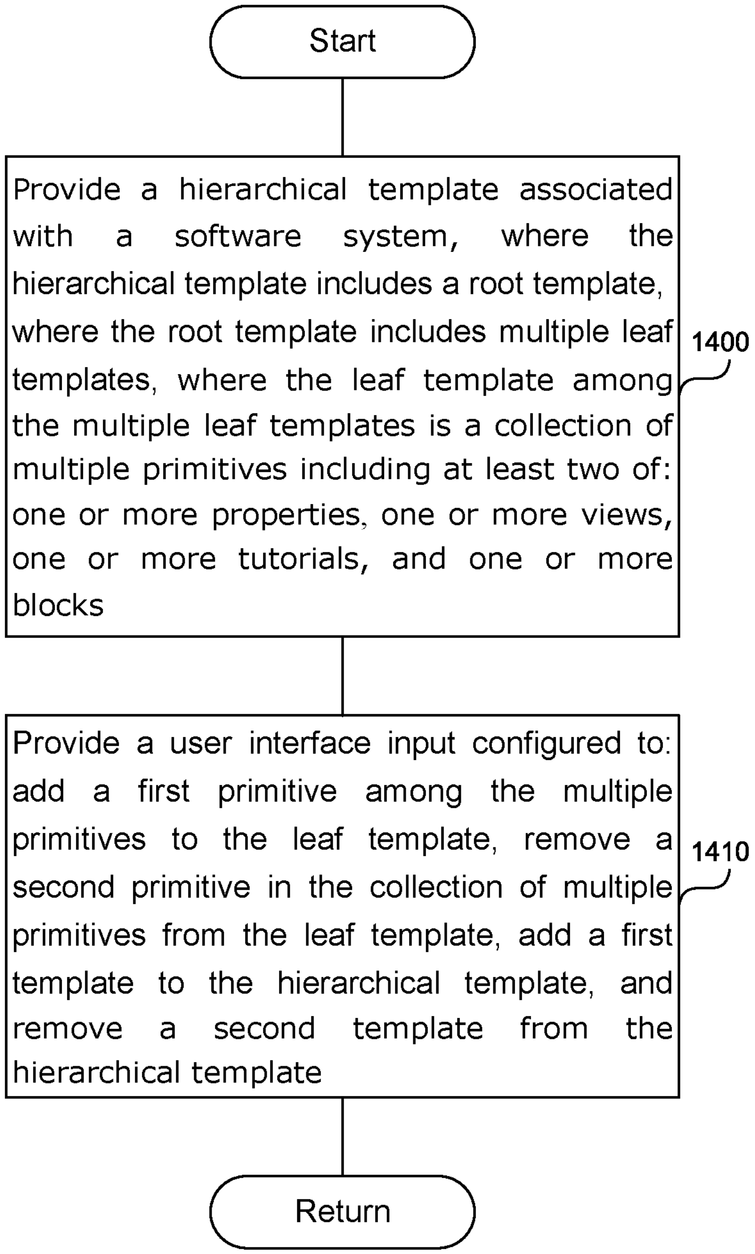
FIG. 14 is a flowchart of a method to enable a user to customize an instance of the hierarchical template at multiple levels.

FIG. 14 is a flowchart of a method to enable a user to customize an instance of the hierarchical template at multiple levels. A hardware or software processor executing instructions described in this application can, in step 1400, provide a hierarchical template associated with a software system. The hierarchical template can include a document template, wiki template, project management template, and/or calendar template. The hierarchical template can include a root template, where the root template includes multiple leaf templates. The leaf template among the multiple leaf templates is a collection of multiple primitives including at least two of one or more properties, one or more views, one or more tutorials, and one or more blocks.

A property among the one or more properties includes a name and a value. A view among the one or more views includes a view of a database according to a criterion, such as tasks associated with a particular sprint, tasks that are in progress, tasks that are due by a particular due date, tasks assigned to a particular person, etc. A tutorial among the one or more tutorials includes an explanation of a use associated with the software system. A block among the one or more blocks is configured to include content. For example, a block can be a paragraph in a document.

In step 1410, the processor can provide a user interface input configured to enable a user to customize an instance of the hierarchical template at multiple levels of the hierarchical template. For example, the processor can enable the user to add a first primitive among the multiple primitives to the leaf template and/or remove a second primitive in the collection of multiple primitives from the leaf template. A primitive can be property that can have values. The processor can enable the user to add, remove, and modify values associated with the property. Further, the processor can enable the user to add a first template to the hierarchical template and/or remove a second template from the hierarchical template. In addition, the processor can enable the user to upgrade from one template to a more advanced template. For example, the processor can enable the user to upgrade a to-do list, i.e. a task database, to a project template which includes projects and tasks databases without losing data and/or having to redo their project management solution from scratch.

The processor can provide the hierarchical template where the root template includes a database, where a first leaf template among the multiple leaf templates includes multiple properties, and where a second leaf template among the multiple leaf templates includes multiple views. A view among the multiple views includes a subset of properties among the multiple properties satisfying a criterion. The processor can receive an input from the user to create an instance of the database. The processor can create the instance of the database including the multiple properties and the multiple views. The processor can receive an input indicating to add the first primitive including a second view or a second property. The processor can modify the instance of the database to include the second view or the second property.

The processor can provide the hierarchical template where the root template includes multiple features. The hierarchical template can include a mid-level node whose parent is the root template, where the mid-level node includes a database. The database is a second hierarchical template. A first leaf template among the multiple leaf templates can include multiple properties, and a second leaf template among the multiple leaf templates can include multiple views. A view among the multiple views includes a subset of properties among the multiple properties satisfying a criterion. The processor can receive an input from the user to create an instance of the feature and can create the instance of the feature including the database, the multiple properties, and the multiple views. The processor can receive an input indicating to add a second database to the feature and can modify the instance of the feature to include the second database.

The processor can provide the hierarchical template where the root template includes an app, where the hierarchical template includes a first mid-level node whose parent is the root template and a second mid-level node positioned between the root template and the leaf template in the hierarchical template. The first mid-level node can include a feature, where the feature is a second hierarchical template. The second mid-level node can include a database, where the database is a third hierarchical template. A first leaf template among the multiple leaf templates can include multiple properties. A second leaf template among the multiple leaf templates can include multiple views, where a view among the multiple views includes a subset of properties among the multiple properties satisfying a criterion. The processor can receive an input from the user to create an instance of the app. The processor can create the instance of the app including the feature, the database, the multiple properties, and the multiple views. The processor can receive an input indicating to add a second feature to the app and can modify the instance of the app to include the second feature.

The processor can provide the hierarchical template including the tutorial, where the hierarchical template belongs to a template type including a document, a wiki, a project management, or a calendar. The tutorial depends on the template type. The processor can receive an input from the user to create an instance of the hierarchical template. The processor can create the instance of the hierarchical template including the tutorial. The processor can determine whether a second user is initially accessing the instance of the hierarchical template, e.g., the second user has not accessed the template before. Upon determining that the second user is initially accessing the instance of the hierarchical template, the processor can provide the tutorial to the user. Upon determining that the second user is not initially accessing the template, the processor does not provide the tutorial to the user.

The processor can receive an indication of a persona associated with the user. Each user can have multiple personas based on the user profile. For example, the user can have a home, school, work persona, etc. In addition, based on the user profile, the processor can offer a particular template during onboarding. For example, the user can have a persona indicating that the user is a software company. In that case, the processor can offer a tasks template, tasks and projects template, or tasks, projects, and sprints template that are useful for software project management. For meeting notes, the processor can offer one meeting notes template, which means that the template is private, or the processor can offer multiple meeting notes templates, which means that the templates are public and can track all users' weekly meetings. The processor can obtain an indication of multiple template types associated with multiple hierarchical templates including the hierarchical template, where the hierarchical template belongs to a template type among the multiple template types including a document, a wiki, a project management, or a calendar. Based on the persona associated with the user, the processor can determine the hierarchical template having the template type corresponding to the persona and can provide the hierarchical templates to the user.

The processor can receive an input to move an instance of the block in a first instance of the hierarchical template to a second instance of a second hierarchical template. The processor can determine a first template type associated with the first instance of the hierarchical template and a second template type associated with the second instance of the second hierarchical template. Upon determining that the first template type and the second template type match, the processor can move the instance of the block from the first instance of the hierarchical template to the second instance of the second hierarchical template. Upon determining the first template type and the second template type do not match, the processor can refuse to move the block.

Figure 15:
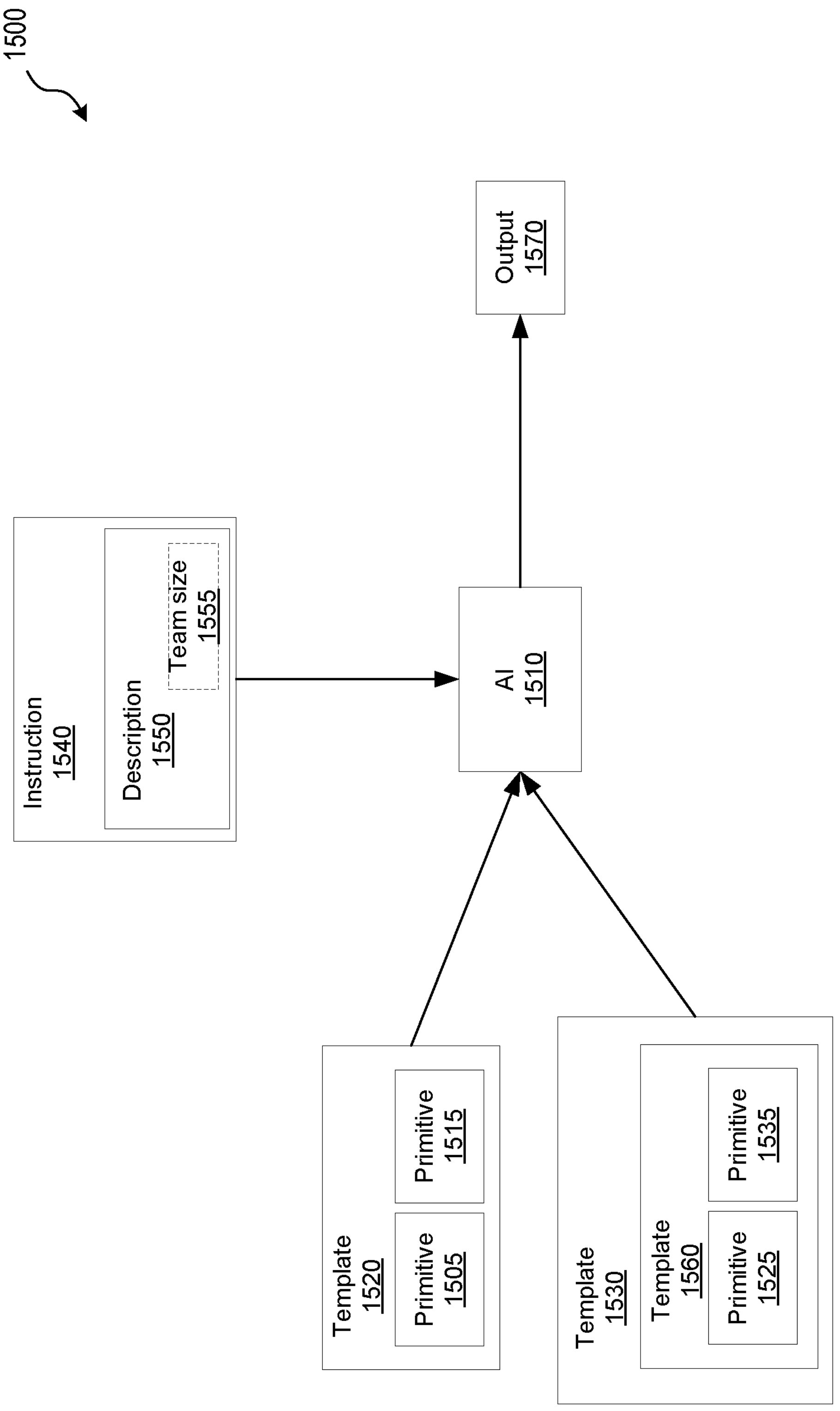
FIG. 15 shows a system that uses artificial intelligence (AI) to generate a customer made template.

Generating a Custom-Made Template Based on a Natural Language Description of a User's Needs FIG. 15 shows a system that uses artificial intelligence (AI) to generate a customer made template. The system 1500 can include an AI 1510 that can be trained using primitives 1505, 1515, 1525, 1535 and/or templates 1520, 1530, 1560, both of which are described in this application. As a result, when the AI 1510 is prompted for a database template, or a tutorial primitive, the AI 1510 can produce the output template 1570 including the appropriate template and/or primitive. Effectively, the AI 1510 can learn the definitions of various primitives and templates described in this application.

The system 1500 can also include the instruction 1540, which can provide a natural language description 1550 specifying the user's needs. The instruction 1540 can state, "We need to do marketing and need a tool for campaign management." The instruction 1540 can include context, namely, "marketing," and an output specification, namely, "tool for campaign management." In response, the AI can create campaign management app 1540 for including a database. The AI 1510 has been trained using databases, and the campaign management app 1540 can include views and primitives.

A workspace, as described in this application, can be a hierarchical template 1530, which includes other templates 1560. To generate the workspace, the user can provide the instruction 1540 to the AI 1510 explaining the type of workspace to create by specifying a title and a natural language description 1550 including keywords. The AI 1510 can gather content related to the title and the natural language description 1550 including keywords. For example, the AI 1510 can modify a previously existing template or can combine multiple previously existing templates.

The natural language description 1550 can include a type of project, such as a software engineering project, and can include team size 1555. Based on the type of project, such as a software engineering project, the system 1500 can determine the type of primitives to include, such as a database, a tutorial, or a project management template. The size of the team can also guide the number of primitives to include. For example, if the type of project is a software engineering project, the system 1500 can include a project management template. The project management template can be a simple to-do list, including a single database, can include multiple databases, or can include multiple databases with sprints.

In another example, if the size of the team is one or two people, the system 1500 can just create a single database as the output template 1570 because the user likely only needs a single to-do list. If the size of the team is between 2 and 10 people, the system 1500 can create multiple databases to group tasks into projects, where each database can correspond to one project. The multiple databases can have dependencies among themselves. If the size of the team is more than 10 people, the system 1500 can create a project management template that includes sprints, which are time-based groups of tasks scheduled on a calendar, with dependencies to downstream sprints.

Figure 16:
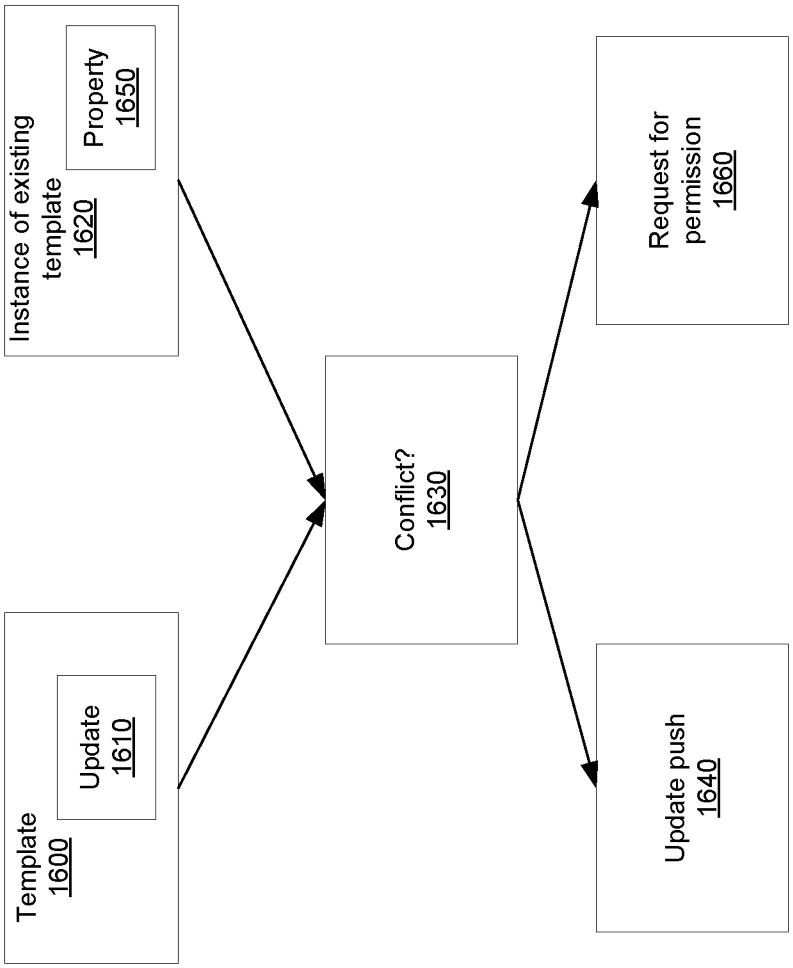
FIG. 16 shows a process to determine whether to update instances of existing templates.

FIG. 16 shows a process to determine whether to update instances of existing templates. The template 1600 can be the output template 1570 in FIG. 15 generated by the AI or can be generated through other methods, such as by an automatic process that is not part of the AI or manually. The template 1600 can include an already existing template and an update 1610. The already existing template can be used by a user as an instance of existing template 1620.

The update 1610 can be compatible or incompatible with the instance of the existing template 1620. To determine whether the update 1610 is compatible or incompatible with the instance of the existing template 1620, the system can store changes to the instance of the existing template 1620 and keep track of all the changes by all the users of the system. When the template 1600 is available to be released, in step 1630, the system can determine whether the update 1610 conflicts with the instance of the existing template 1620.

For example, if the update 1610 adds a new property that has not existed before in the existing template, the system can determine that the update 1610 does not conflict with any of the existing templates and can, in step 1640, push the update to all the instances of the existing template 1620. In another example, if the update 1610 modifies an existing property 1650, the system can determine, on a case-by-case basis, whether the instance of the existing template 1620 modifies the existing property 1650. If the existing template 1620 does not modify the existing property 1650, the system can, in step 1640, push the update to the instances of the existing template 1620 that do not modify the existing property 1650. However, if the existing template 1620 modifies the existing property 1650, the system can, in step 1660, explain the update 1610 and the change to the template that would be made by the update and request permission to make the update. If the permission is received, the system can make the update 1610; however, if the permission is refused, the system does not make the update.

In a more specific example, the update 1610 can change the type of the property 1650 from a checkbox to a list of values. The system can detect that the update 1610 is incompatible and can provide an explanation that the property type is changing to a list of your values and request permission to make the update.

The system can store changes to the instance of the existing template 1620 based on the type of the template. For example, if the type of the template is a docs template, the system does not keep track of status and changes and does not push update 1610 to doc templates. However, for app and features templates, e.g., the more complex templates that are hierarchical, the system does keep track of the changes to the instance of the existing template 1620 and can automatically push updates 1610 to the existing instances.

Figure 17:
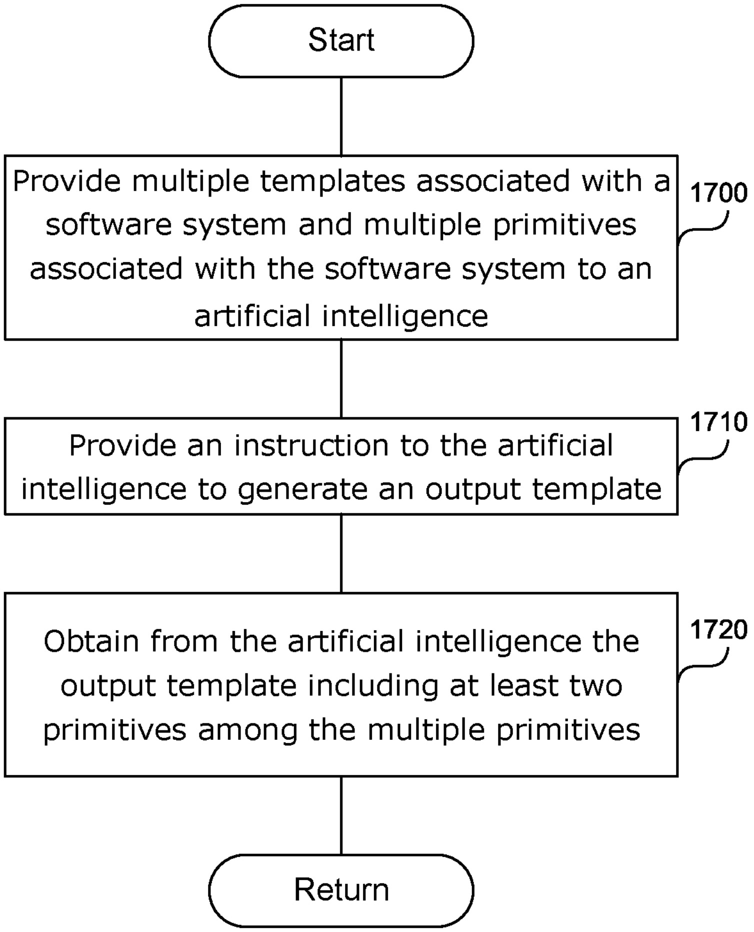
FIG. 17 is a flowchart of a method to generate a custom-made template based on a natural language description of a user's needs.

FIG. 17 is a flowchart of a method to generate a custom-made template based on a natural language description of a user's needs. A hardware or software processor executing instructions describing this application can, in step 1700, provide multiple templates associated with a software system and multiple primitives associated with the software system to an artificial intelligence. The providing of the multiple templates and the multiple primitives can be done by training the AI or as part of an instruction, e.g., prompt, to the AI.

A template among the multiple templates can include a subset of the multiple primitives. The multiple primitives can include one or more properties, one or more views, one or more tutorials, and one or more blocks. A property among the one or more properties can include a name and a value. A view among the one or more views includes a view of a database according to a criterion. A tutorial among the one or more tutorials can include an explanation of a use associated with the software system. A block among the one or more blocks is configured to include content. For example, the block can be a paragraph of text.

In step 1710, the processor can provide an instruction to the artificial intelligence to generate an output template, where the instruction includes an attribute associated with a user of the software system. The instruction can be expressed in a natural language.

In step 1720, the processor can obtain from the artificial intelligence the output template including at least two primitives among the multiple primitives, where the at least two primitives are selected based on the attribute associated with the user of the software system.

The processor can provide the instruction to the artificial intelligence to generate the output template, where the instruction includes the attribute associated with the user of the software system. The attribute can include a natural language description associated with the output template and a size of a team associated with the output template. Based on the natural language description, the processor can determine a primitive among the multiple primitives to include in the output template. Based on the size of the team, the processor can determine a number of the primitive to include in the output template.

The processor can provide the instruction to the artificial intelligence to generate the output template, where the instruction includes the attribute associated with the user of the software system. The attribute can indicate a size of a team associated with the output template. The processor can obtain a first predetermined threshold and second predetermined threshold. The processor can determine whether the size of the team is below the first predetermined threshold, e.g., two people. Upon determining the size of the team is equal to or below the first predetermined threshold, the processor can generate the output template including a single database. The processor can determine whether the size of the team is between the first predetermined threshold and the second predetermined threshold, e.g., 10 people. Upon determining that the size of the team is between the first predetermined threshold and the second predetermined threshold, the processor can generate the output template including a first multiplicity of databases. The first multiplicity of databases can depend on each other. The processor can determine whether the size of the team is above the second predetermined threshold. Upon determining that the size of the team is above the second predetermined threshold, the processor can generate the output template including a second multiplicity of databases, where a first database among the second multiplicity of databases depends on a second database among the second multiplicity of databases. For example, the first database can represent a first sprint, while the second database can represent a second sprint. The initiation of the second sprint can depend on the completion of the first sprint or completion of certain tasks within the first sprint.

The processor can obtain the output template and an instance of an existing template, where the output template includes an update to the existing template. The processor can determine whether the update changes a primitive associated with the instance of the existing template. Upon determining that the update does not change the primitive associated with the instance of the existing template, the processor can push the update to the existing template. Upon determining that the update changes the primitive associated with the instance of the existing template, the processor can provide an explanation associated with the update and query whether to proceed with the update. If the processor receives an affirmative answer, the processor can push the update.

The processor can obtain the output template and an instance of an existing template, where the output template includes an update to the existing template. The processor can determine whether the update changes a primitive associated with the instance of the existing template. Upon determining that the update changes the primitive associated with the instance of the existing template, the processor can determine whether the primitive has been modified in the instance of the existing template. For example, the primitive to be updated may be part of the instance of the existing template; however, the primitive may not be used in the instance of the existing template. Alternatively, the primitive may be used in the instance of the existing template; however, its value may not be said, so updating the primitive does not meaningfully change the instance of the existing template. Upon determining that the primitive has not been modified in the instance of the existing template, the processor can push the update to the existing template. Upon determining that the primitive has been modified in the instance of the existing template, the processor can provide an explanation associated with the update and query whether to proceed with the update.

The processor can provide the template among the multiple templates, where the template is a hierarchical template including a root template having a child template. The child template can include multiple primitives.

The processor can provide the template among the multiple templates, where the template is a hierarchical template including a root template having multiple child templates, where the multiple child templates include multiple databases. A database among the multiple databases can include multiple properties and a view. A first property in a first database among the multiple databases can depend on a second property in a second database among the multiple databases. Consequently, updating the second property in the second database causes a change to the first property in the first database.

Computer System

Figure 18:
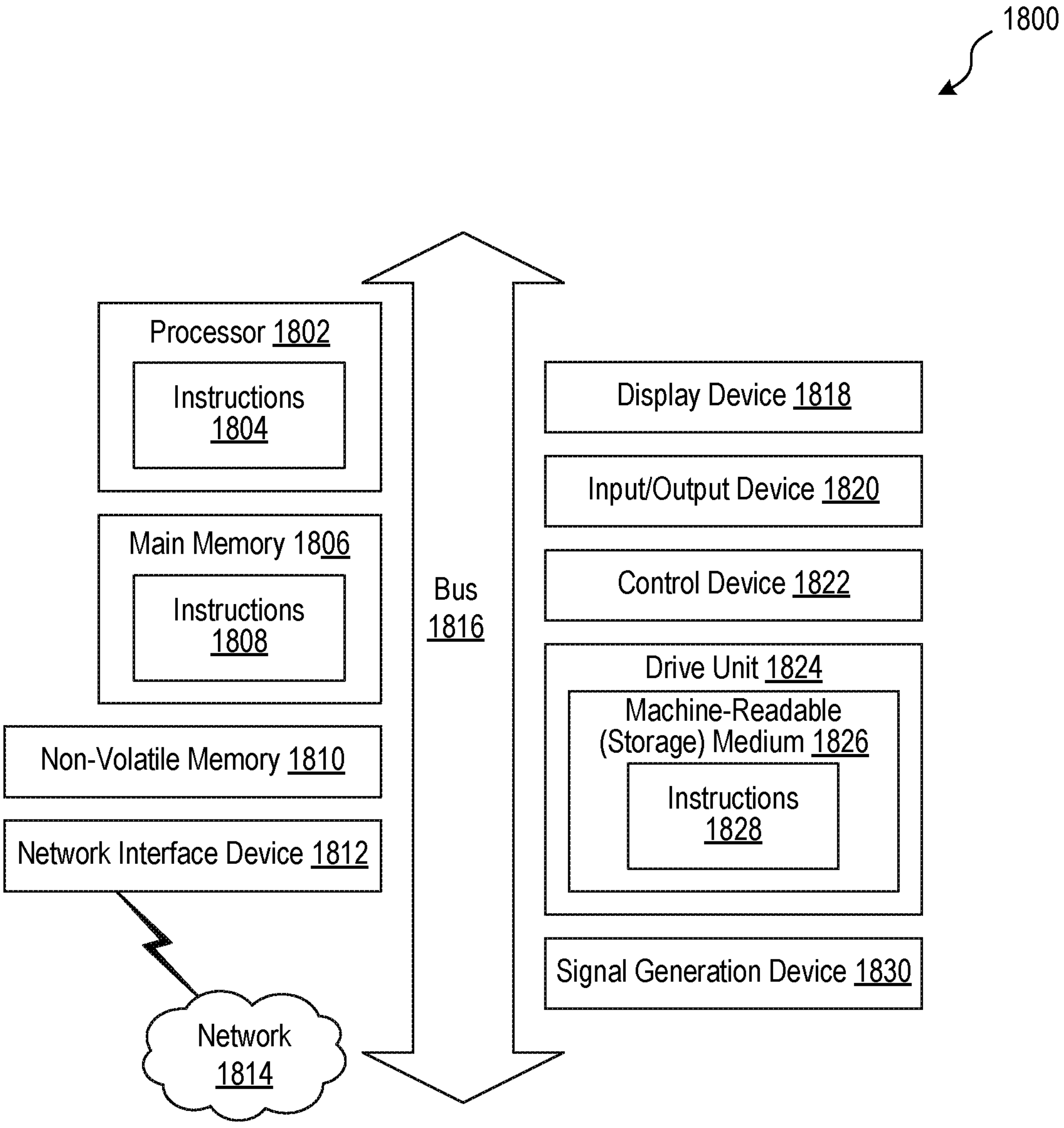
FIG. 18 is a block diagram that illustrates an example of a computer system in which at least some operations described herein can be implemented.

FIG. 18 is a block diagram that illustrates an example of a computer system 1800 in which at least some operations described herein can be implemented. As shown, the computer system 1800 can include: one or more processors 1802, main memory 1806, non-volatile memory 1810, a network interface device 1812, a video display device 1818, an input/output device 1820, a control device 1822 (e.g., keyboard and pointing device), a drive unit 1824 that includes a machine-readable (storage) medium 1826, and a signal generation device 1830 that are communicatively connected to a bus 1816. The bus 1816 represents one or more physical buses and/or point-to-point connections that are connected by appropriate bridges, adapters, or controllers. Various common components (e.g., cache memory) are omitted from FIG. 18 for brevity. Instead, the computer system 1800 is intended to illustrate a hardware device on which components illustrated or described relative to the examples of the Figures and any other components described in this specification can be implemented.

The computer system 1800 can take any suitable physical form. For example, the computing system 1800 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 1800. In some implementations, the computer system 1800 can be an embedded computer system, a system-on-chip (SOC), a single-board computer system (SBC), or a distributed system such as a mesh of computer systems, or it can include one or more cloud components in one or more networks. Where appropriate, one or more computer systems 1800 can perform operations in real time, in near real time, or in batch mode.

The network interface device 1812 enables the computing system 1800 to mediate data in a network 1814 with an entity that is external to the computing system 1800 through any communication protocol supported by the computing system 1800 and the external entity. Examples of the network interface device 1812 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 1806, non-volatile memory 1810, machine-readable medium 1826) can be local, remote, or distributed. Although shown as a single medium, the machine-readable medium 1826 can include multiple media (e.g., a centralized/distributed database and/or associated caches and servers) that store one or more sets of instructions 1828. The machine-readable medium 1826 can include any medium that is capable of storing, encoding, or carrying a set of instructions for execution by the computing system 1800. The machine-readable medium 1826 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 1810, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1804, 1808, 1828) set at various times in various memory and storage devices in computing device(s). When read and executed by the processor 1802, the instruction(s) cause the computing system 1800 to perform operations to execute elements involving the various aspects of the disclosure.

REMARKS

The terms "example," "embodiment," and "implementation" are used interchangeably. For example, references to "one example" or "an example" in the disclosure can be, but not necessarily are, references to the same implementation, and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variant thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the Detailed Description above using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the Detailed Description above explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties except for any subject matter disclaimers or disavowals and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

The invention claimed is:

1. A non-transitory, computer-readable storage medium comprising instructions recorded thereon, wherein the instructions, when executed by at least one data processor of a system, cause the system to:

provide multiple templates associated with a software system and multiple primitives associated with the software system to an artificial intelligence, wherein a template among the multiple templates includes a subset of the multiple primitives, wherein the multiple primitives include one or more properties, one or more views, one or more tutorials, and one or more blocks, wherein a property among the one or more properties includes a name and a value, wherein a view among the one or more views includes a view of a database according to a criterion, wherein a tutorial among the one or more tutorials includes an explanation of a use associated with the software system, wherein a block among the one or more blocks is configured to include content;

provide an instruction to the artificial intelligence to generate an output template, wherein the instruction includes an attribute associated with a user of the software system, and wherein the attribute includes a natural language description associated with the output template;

based on the natural language description, determine a first primitive among the multiple primitives to include in the output template; and obtain from the artificial intelligence the output template including the first primitive and at least one additional primitive among the multiple primitives, wherein the at least one additional primitive is selected based on the attribute associated with the user of the software system.

2. The non-transitory, computer-readable storage medium of claim 1, comprising instructions to:

provide the instruction to the artificial intelligence to generate the output template, wherein the instruction includes the attribute associated with the user of the software system, wherein the attribute includes the natural language description associated with the output template and a size of a team associated with the output template;

based on the natural language description, determine a primitive among the multiple primitives to include in the output template; and based on the size of the team, determine a number of the primitive to include in the output template.

3. The non-transitory, computer-readable storage medium of claim 1, comprising instructions to:

provide the instruction to the artificial intelligence to generate the output template, wherein the instruction includes the attribute associated with the user of the software system, wherein the attribute indicates a size of a team associated with the output template;

obtain a first predetermined threshold and second predetermined threshold;

determine whether the size of the team is below the first predetermined threshold;

upon determining the size of the team is equal to or below the first predetermined threshold, generate the output template including a single database;

determine whether the size of the team is between the first predetermined threshold and the second predetermined threshold;

upon determining that the size of the team is between the first predetermined threshold and the second predetermined threshold, generate the output template including a first multiplicity of databases;

determine whether the size of the team is above the second predetermined threshold; and upon determining that the size of the team is above the second predetermined threshold, generate the output template including a second multiplicity of databases, wherein a first database among the second multiplicity of databases depends on a second database among the second multiplicity of databases.

4. The non-transitory, computer-readable storage medium of claim 1, comprising instructions to:

obtain the output template and an instance of an existing template, wherein the output template includes an update to the existing template;

determine whether the update changes a primitive associated with the instance of the existing template, upon determining that the update does not change the primitive associated with the instance of the existing template, push the update to the existing template; and upon determining that the update changes the primitive associated with the instance of the existing template:

provide an explanation associated with the update, and query whether to proceed with the update.

5. The non-transitory, computer-readable storage medium of claim 1, comprising instructions to:

obtain the output template and an instance of an existing template, wherein the output template includes an update to the existing template;

determine whether the update changes a primitive associated with the instance of the existing template;

upon determining that the update changes the primitive associated with the instance of the existing template, determine whether the primitive has been modified in the instance of the existing template;

upon determining that the primitive has not been modified in the instance of the existing template, push the update to the existing template; and upon determining that the primitive has been modified in the instance of the existing template:

provide an explanation associated with the update, and query whether to proceed with the update.

6. The non-transitory, computer-readable storage medium of claim 1, comprising instructions to:

provide the template among the multiple templates, wherein the template is a hierarchical template including a root template having a child template, wherein the child template includes at least two of the multiple primitives.

7. The non-transitory, computer-readable storage medium of claim 1, comprising instructions to:

provide the template among the multiple templates, wherein the template is a hierarchical template including a root template having multiple child templates, wherein the multiple child templates include multiple databases, wherein a database among the multiple databases includes multiple properties and the view, wherein a first property in a first database among the multiple databases depends on a second property in a second database among the multiple databases, and wherein updating the second property in the second database causes a change to the first property in the first database.

8. A method comprising:

providing multiple templates associated with a software system and multiple primitives associated with the software system to an artificial intelligence, wherein a template among the multiple templates includes a subset of the multiple primitives;

providing an instruction to the artificial intelligence to generate an output template, wherein the instruction includes an attribute associated with a user of the software system, wherein the attribute includes a natural language description associated with the output template;

based on the natural language description, determine a first primitive among the multiple primitives to include in the output template; and obtaining from the artificial intelligence the output template including the first primitive and at least one additional primitive among the multiple primitives, wherein the at least one additional primitive is selected based on the attribute associated with the user of the software system.

9. The method of claim 8, comprising:

providing the instruction to the artificial intelligence to generate the output template, wherein the instruction includes the attribute associated with the user of the software system, wherein the attribute includes the natural language description associated with the output template and a size of a team associated with the output template;

based on the natural language description, determining a primitive among the multiple primitives to include in the output template; and based on the size of the team, determining a number of the primitive to include in the output template.

10. The method of claim 8, comprising:

providing the instruction to the artificial intelligence to generate the output template, wherein the instruction includes the attribute associated with the user of the software system, wherein the attribute indicates a size of a team associated with the output template;

obtaining a first predetermined threshold and second predetermined threshold;

determining whether the size of the team is below the first predetermined threshold;

upon determining the size of the team is equal to or below the first predetermined threshold, generating the output template including a single database;

determining whether the size of the team is between the first predetermined threshold and the second predetermined threshold;

upon determining that the size of the team is between the first predetermined threshold and the second predetermined threshold, generating the output template including a first multiplicity of databases;

determining whether the size of the team is above the second predetermined threshold; and upon determining that the size of the team is above the second predetermined threshold, generating the output template including a second multiplicity of databases, wherein a first database among the second multiplicity of databases depends on a second database among the second multiplicity of databases.

11. The method of claim 8, comprising:

obtaining the output template and an instance of an existing template, wherein the output template includes an update to the existing template;

determining whether the update changes a primitive associated with the instance of the existing template;

upon determining that the update does not change the primitive associated with the instance of the existing template, pushing the update to the existing template; and upon determining that the update changes the primitive associated with the instance of the existing template:

providing an explanation associated with the update, and querying whether to proceed with the update.

12. The method of claim 8, comprising:

obtaining the output template and an instance of an existing template, wherein the output template includes an update to the existing template;

determining whether the update changes a primitive associated with the instance of the existing template;

upon determining that the update changes the primitive associated with the instance of the existing template, determining whether the primitive has been modified in the instance of the existing template;

upon determining that the primitive has not been modified in the instance of the existing template, pushing the update to the existing template; and upon determining that the primitive has been modified in the instance of the existing template:

providing an explanation associated with the update, and querying whether to proceed with the update.

13. The method of claim 8, comprising:
providing the template among the multiple templates,
wherein the template is a hierarchical template including a root template having multiple child templates,
wherein the multiple child templates include multiple databases,
wherein a database among the multiple databases includes multiple properties and a view,
wherein a first property in a first database among the multiple databases depends on a second property in a second database among the multiple databases, and
wherein updating the second property in the second database causes a change to the first property in the first database.

14. A system comprising:
at least one hardware processor; and
at least one non-transitory memory storing instructions, which, when executed by the at least one hardware processor, cause the system to:
provide multiple templates associated with a software system and multiple primitives associated with the software system to an artificial intelligence,
wherein a template among the multiple templates includes a subset of the multiple primitives;
provide an instruction to the artificial intelligence to generate an output template,
wherein the instruction includes an attribute associated with a user of the software system,
wherein the attribute includes a natural language description associated with the output template;
based on the natural language description, determine a first primitive among the multiple primitives to include in the output template; and
obtain from the artificial intelligence the output template including the first primitive and at least one additional primitive among the multiple primitives,
wherein the at least one additional primitive is selected based on the attribute associated with the user of the software system.

15. The system of claim 14, comprising instructions to:
provide the instruction to the artificial intelligence to generate the output template,
wherein the instruction includes the attribute associated with the user of the software system,
wherein the attribute includes the natural language description associated with the output template and a size of a team associated with the output template;
based on the natural language description, determine a primitive among the multiple primitives to include in the output template; and
based on the size of the team, determine a number of the primitive to include in the output template.

16. The system of claim 14, comprising instructions to:
provide the instruction to the artificial intelligence to generate the output template,
wherein the instruction includes the attribute associated with the user of the software system,
wherein the attribute indicates a size of a team associated with the output template;
obtain a first predetermined threshold and second predetermined threshold;
determine whether the size of the team is below the first predetermined threshold;
upon determining the size of the team is equal to or below the first predetermined threshold, generate the output template including a single database;
determine whether the size of the team is between the first predetermined threshold and the second predetermined threshold;
upon determining that the size of the team is between the first predetermined threshold and the second predetermined threshold, generate the output template including a first multiplicity of databases;
determine whether the size of the team is above the second predetermined threshold; and
upon determining that the size of the team is above the second predetermined threshold, generate the output template including a second multiplicity of databases,
wherein a first database among the second multiplicity of databases depends on a second database among the second multiplicity of databases.

17. The system of claim 14, comprising instructions to:
obtain the output template and an instance of an existing template, wherein the output template includes an update to the existing template;
determine whether the update changes a primitive associated with the instance of the existing template;
upon determining that the update does not change the primitive associated with the instance of the existing template, push the update to the existing template; and
upon determining that the update changes the primitive associated with the instance of the existing template:
provide an explanation associated with the update, and query whether to proceed with the update.

18. The system of claim 14, comprising instructions to:
obtain the output template and an instance of an existing template, wherein the output template includes an update to the existing template;
determine whether the update changes a primitive associated with the instance of the existing template;
upon determining that the update changes the primitive associated with the instance of the existing template, determine whether the primitive has been modified in the instance of the existing template;
upon determining that the primitive has not been modified in the instance of the existing template, push the update to the existing template; and
upon determining that the primitive has been modified in the instance of the existing template:
provide an explanation associated with the update, and query whether to proceed with the update.

19. The system of claim 14, comprising instructions to:
provide the template among the multiple templates,
wherein the template is a hierarchical template including a root template having a child template,
wherein the child template includes at least two of the multiple primitives.

20. The system of claim 14, comprising instructions to:
provide the template among the multiple templates,
wherein the template is a hierarchical template including a root template having multiple child templates,
wherein the multiple child templates include multiple databases,
wherein a database among the multiple databases includes multiple properties and a view,
wherein a first property in a first database among the multiple databases depends on a second property in a second database among the multiple databases, and
wherein updating the second property in the second database causes a change to the first property in the first database.

* * * * *